United States Patent
Itta et al.

(10) Patent No.: US 11,898,608 B2
(45) Date of Patent: Feb. 13, 2024

(54) TOLERANCE RING, METHOD, AND ASSEMBLY FOR COMPONENT RETENTION CONTROL

(71) Applicant: SAINT-GOBAIN PERFORMANCE PLASTICS RENCOL LIMITED, Coventry (GB)

(72) Inventors: Florian Itta, Renchen (DE); Charles Gage, Bristol (GB); Stephen Saunders, Bristol (GB)

(73) Assignee: SAINT-GOBAIN PERFORMANCE PLASTICS RENCOL LIMITED, Coventry (GB)

(*) Notice: Subject to any disclaimer, the term of this patent is extended or adjusted under 35 U.S.C. 154(b) by 820 days.

(21) Appl. No.: 15/954,703

(22) Filed: Apr. 17, 2018

(65) Prior Publication Data
US 2018/0306248 A1    Oct. 25, 2018

Related U.S. Application Data

(60) Provisional application No. 62/488,394, filed on Apr. 21, 2017.

(51) Int. Cl.
*F16D 1/08* (2006.01)
*F16D 7/02* (2006.01)

(52) U.S. Cl.
CPC .......... *F16D 1/0835* (2013.01); *F16D 7/021* (2013.01); *Y10T 403/7061* (2015.01)

(58) Field of Classification Search
CPC .. F16D 1/0835; F16D 7/021; Y10T 403/7058; Y10T 403/7061
See application file for complete search history.

(56) References Cited

U.S. PATENT DOCUMENTS

| | | | | |
|---|---|---|---|---|
| 979,317 A * | 12/1910 | Lockwood | ............. | F16C 33/58 |
| 3,156,281 A | 11/1964 | Demi | | |
| 4,376,254 A * | 3/1983 | Hellmann | ............. | H01R 39/14 |
| | | | | 310/219 |
| 4,756,640 A * | 7/1988 | Gehrke | ................... | F16B 21/16 |
| | | | | 403/326 |
| 4,828,423 A | 5/1989 | Cramer, Jr. et al. | | |
| 4,981,390 A | 1/1991 | Cramer, Jr. et al. | | |
| 5,758,545 A * | 6/1998 | Fevre | .................... | B62D 1/185 |
| | | | | 280/775 |
| 6,606,224 B2 | 8/2003 | MacPherson et al. | | |
| 7,390,980 B1 * | 6/2008 | Gretz | ...................... | H02G 3/06 |
| | | | | 174/666 |

(Continued)

FOREIGN PATENT DOCUMENTS

AU          562206 B2    6/1987
DE    102011077361 A1   12/2012

(Continued)

OTHER PUBLICATIONS

International Search Report for PCT/EP2018/059754, dated Jul. 20, 2018, 12 pages.

*Primary Examiner* — Michael P Ferguson
(74) *Attorney, Agent, or Firm* — Abel Schillinger, LLP; Ann Palma

(57) ABSTRACT

A tolerance ring including a sidewall and at least one projection from the sidewall that projects radially and axially to prevent axial displacement of the tolerance ring with respect to a component interior or exterior to the tolerance ring.

15 Claims, 8 Drawing Sheets

(56) References Cited

U.S. PATENT DOCUMENTS

| | | | | |
|---|---|---|---|---|
| 7,610,671 B2* | 11/2009 | Watkins | .................. | F16C 27/04 |
| | | | | 29/525.01 |
| 7,670,079 B2* | 3/2010 | Snadden | ................ | F16C 27/04 |
| | | | | 403/372 |
| 8,052,406 B2* | 11/2011 | Li | ...................... | F04C 18/0215 |
| | | | | 418/55.1 |
| 8,282,308 B2* | 10/2012 | Slayne | .................... | F16B 19/02 |
| | | | | 403/372 |
| 8,746,981 B2* | 6/2014 | Hartmann | ............. | F16C 27/063 |
| | | | | 403/372 |
| 9,062,700 B2 | 6/2015 | Pennsiriwongse | | |
| 2008/0025655 A1 | 1/2008 | Creviston et al. | | |
| 2010/0046867 A1 | 2/2010 | Hosmer et al. | | |
| 2011/0076096 A1* | 3/2011 | Slayne | ..................... | F16D 3/06 |
| | | | | 403/372 |
| 2015/0028644 A1* | 1/2015 | Hagan | ................. | F16C 29/002 |
| | | | | 297/410 |

FOREIGN PATENT DOCUMENTS

| | | | |
|---|---|---|---|
| GB | 1080302 A | 8/1967 | |
| JP | 2015120414 A | 7/2015 | |
| KR | 20160057773 A | 5/2016 | |
| WO | 2005106269 A1 | 11/2005 | |
| WO | 2018192914 A1 | 10/2018 | |

\* cited by examiner

TOLERANCE RING, METHOD, AND ASSEMBLY FOR COMPONENT RETENTION CONTROL

CROSS-REFERENCE TO RELATED APPLICATION(S)

This application claims priority under 35 U.S.C. § 119(e) to U.S. Patent Application No. 62/488,394 entitled "TOLERANCE RING, METHOD, AND ASSEMBLY FOR COMPONENT RETENTION CONTROL," by Florian Itta et al., filed Apr. 21, 2017, which is assigned to the current assignee hereof and incorporated herein by reference in its entirety.

FIELD OF THE DISCLOSURE

The invention generally relates to tolerance rings that are located between assemblies involving moving parts and, in particular, to an improved method and assembly employing a tolerance ring.

BACKGROUND

Tolerance rings constrain movement between assemblies involving relatively moving parts, such as inner components including, but not limited to, shafts, and outer components, including, but not limited to, housings. The shaft may rotate within a bore created within the housing. One type of tolerance ring is a band located in a gap between the outer surface of the shaft and the inner surface of the bore. This tolerance ring limits radial motion of the shaft within the bore while still permitting rotation. Tolerance rings may also be used in subassembly components such as rotors, stators, shafts, housings, and ball bearing for e-motor assemblies.

In conventional tolerance ring configurations, a close fit between the inner and outer components is sought. In addition, either forces for providing maximal frictional engagement or minimal variation in sliding forces are sought. A close fit between the components is desirable because it reduces relative vibration between the parts. These requirements between the inner and outer components require strong and substantial contact, which increases frictional forces. Further, reduced assembly forces, costs, and assembly time are desired with weight reductions in components within the assemblies. In some conventional assemblies involving ball bearings, brinelling of the ball bearing during assembly may occur so additional vents may be necessary due to component failure, such as component cracking.

Further, tolerance rings that provide torque overload protection for applications with torques greater than 50 Nm, with relatively low rates of rotation and small angular slip cycles also are known. These applications include reduction gear mounts, power steps on four wheel drive trucks and seat motors for fold away seats. Tolerance rings for these applications tend to be heat-treated carbon steel, greater than 0.40 mm thick, and have many strong, high friction waves to provide the required torque. Although these solutions are workable for some applications, improvements in tolerance rings and assemblies involving them continue to be of interest.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

The use of the same reference symbols in different drawings indicates similar or identical items.

DETAILED DESCRIPTION OF THE INVENTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring assembly and component arts.

Figure 1:
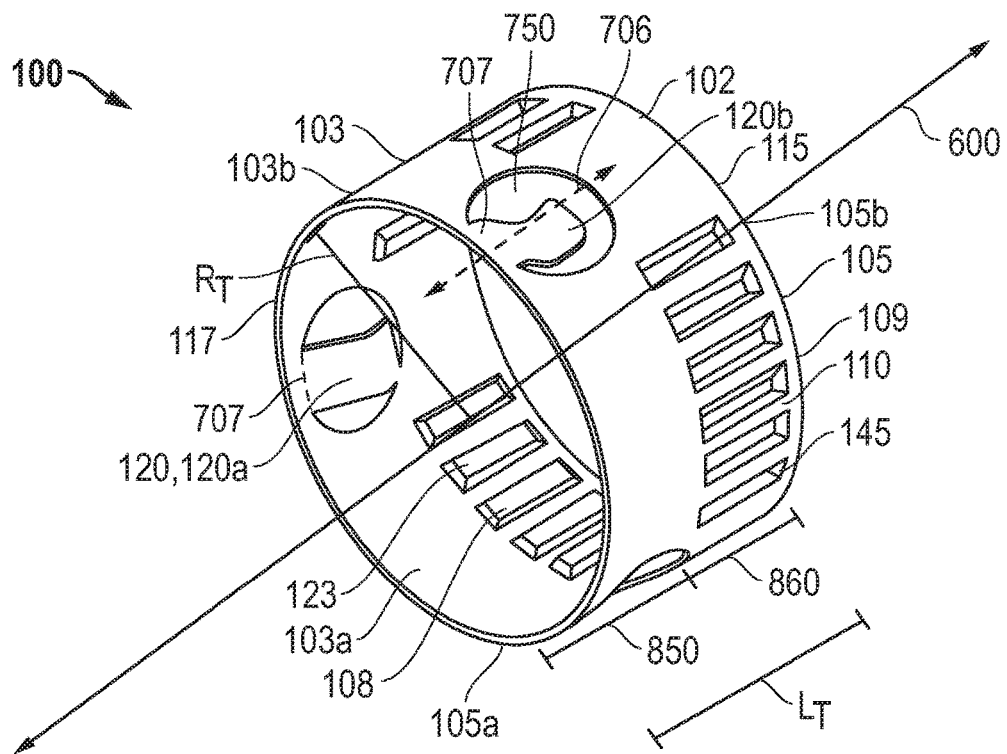
FIG. 1 is a perspective view of one embodiment of a tolerance ring constructed in accordance with the invention.
Figure 2:
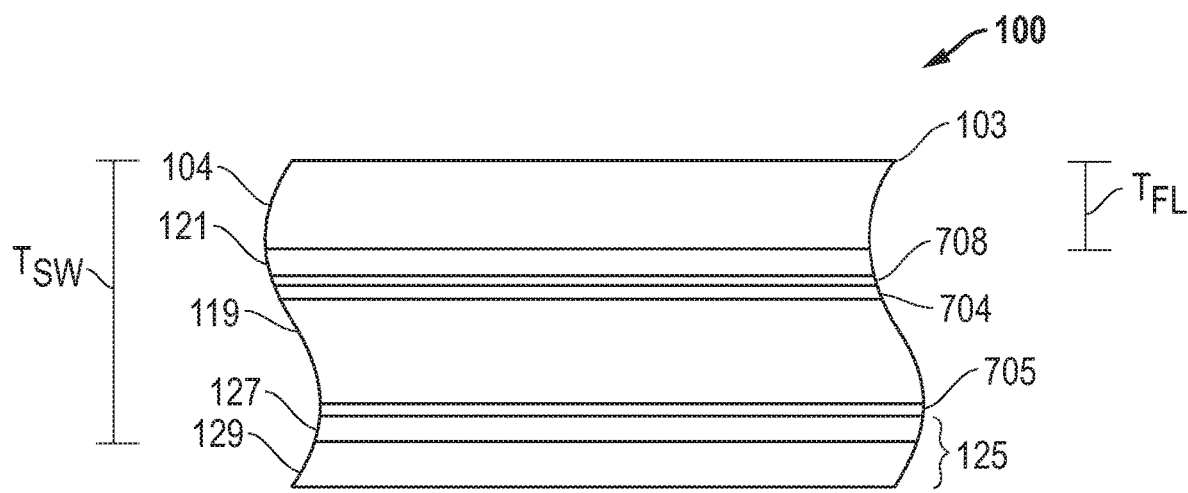
FIG. 2 is a schematic sectional side view of another embodiment of a tolerance ring having multiple layers and is constructed in accordance with the invention.
Figure 3:
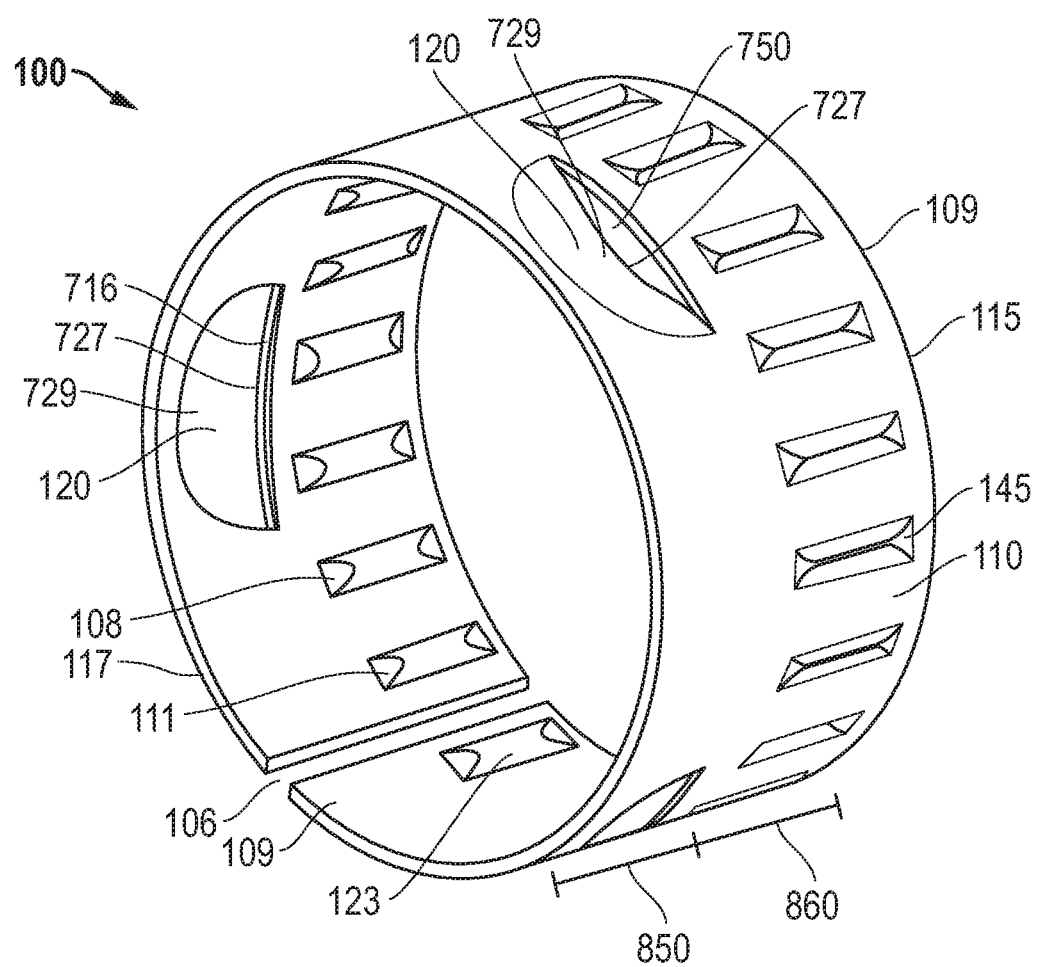
FIG. 3 is a perspective view of one embodiment of a tolerance ring constructed in accordance with the invention.
Figure 4B:
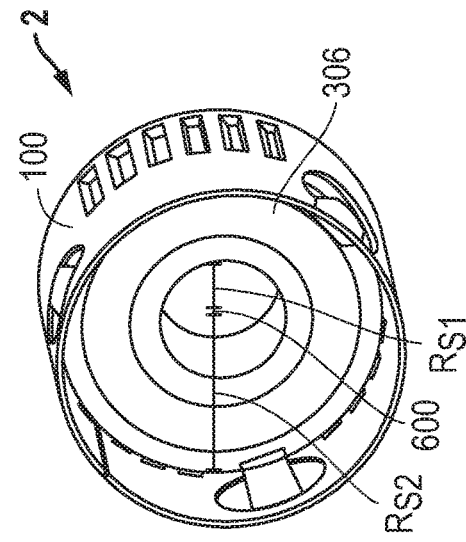
FIG. 4B is a schematic sectional side view of an assembly including a tolerance ring constructed in accordance with the invention.
Figure 4D:
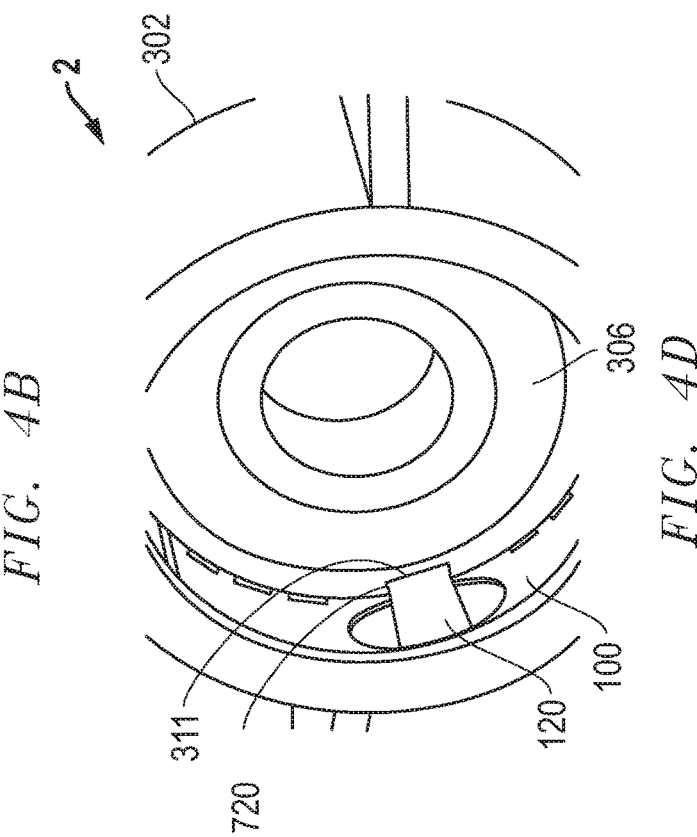
FIG. 4D is a schematic sectional side view of an assembly including a tolerance ring constructed in accordance with the invention.
Figure 4A:
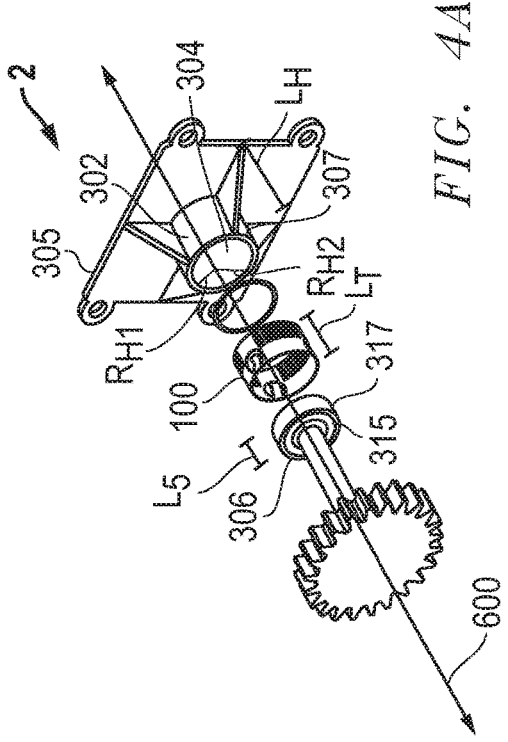
FIG. 4A is a schematic sectional side view of an assembly including a tolerance ring constructed in accordance with the invention.
Figure 4C:
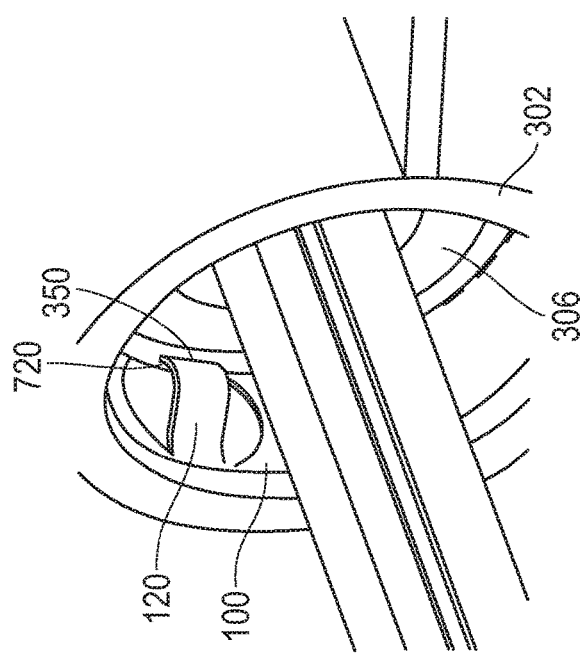
FIG. 4C is a schematic sectional side view of an assembly including a tolerance ring constructed in accordance with the invention.

FIG. 1 depicts a tolerance ring 100 according to a number of embodiments. The tolerance ring 100 comprises a band 102 of resilient material that may be curved into a ring-like (substantially annular) shape about a central axis 600. The tolerance ring 100 may have a first axial end 115 and a second axial end 117. The band 102 may include a sidewall 103. In an embodiment, the band 102 may include an interior sidewall 103a and an exterior sidewall 103b. The sidewall 103 may have an axial edge 105. In a number of embodiments, the sidewall 103 may have a first axial edge 105a and a second axial edge 105b. In an embodiment, as shown in FIG. 3, the ends of the band 102 do not meet (e.g., it may be formed as a split ring), thereby leaving an axial gap 106 adjacent the circumference of the band. In other embodiments, the band may be curved so that the ends overlap with one another. In yet further embodiments, the band may be a continuous, unbroken ring. In an embodiment, the interior sidewall 103a may include an inner surface. In an embodiment, the exterior sidewall 103b may include an outer surface. In an embodiment, as shown in FIG. 2, the tolerance ring 100 may include a substrate 119 and a low friction layer 104. In an embodiment, the inner surface of the interior sidewall 103a may have a low friction layer 104a that conforms to the shape of the band. In an embodiment, the outer surface of the exterior sidewall 103b may have a low friction layer 104b that conforms to the shape of the band.

FIGS. 4A-4D depict an assembly 2 which incorporates, for example, the tolerance ring 100 shown in FIG. 1 according to a number of embodiments. The assembly 2 further includes a housing 302 or outer component ("housing" and "outer component" used interchangeably herein). The housing 302 or outer component may have a first axial end 305 and a second axial end 307. The housing 302 may have an axial bore 304 formed therein, which receives a shaft 306 or inner component ("shaft" and "inner component" used interchangeably herein). Tolerance rings 100 may be used to transfer torque between the outer component 302 and the inner component 306. The shaft 306 or inner component may have a first axial end 315 and a second axial end 317. Tolerance rings 100 may be used to provide a frictional fit between the outer component 302 and the inner component 306. In a number of embodiments, the tolerance ring 100 may be fixed to at least one of the inner component 306 or the outer component 302 through form fitting, force fitting, or bonding (including, but not limited to, adhesive bonding). Optionally the assembly may include a fit ring 502.

In an embodiment, the housing 302 or outer component can include any material commonly used in the rotational assembly arts. The housing 302 or outer component can comprise any suitable material with sufficient rigidity to withstand axial and longitudinal forces. In a particular embodiment, the housing 302 or outer component can comprise an injection molded polymer. In another embodiment, the housing 302 or outer component can comprise a metal or alloy formed through a machining process. In yet another embodiment, the housing 302 or outer component can comprise a ceramic or any other suitable material. The housing 302 or outer component can be formed from a single piece, two pieces, or several pieces joined together by welding, adhesive, fasteners, threading, or any other suitable fastening means.

In an embodiment, the shaft 306 or inner component can include any material commonly used in the rotational assembly arts. The shaft 306 or inner component can comprise any suitable material with sufficient rigidity to withstand axial and longitudinal forces. In a particular embodiment, the shaft 306 or inner component can comprise an injection molded polymer. In another embodiment, the shaft 306 or inner component can comprise a metal or alloy formed through a machining process. In yet another embodiment, the shaft 306 or inner component can comprise a ceramic or any other suitable material. The shaft 306 or inner component can be formed from a single piece, two pieces, or several pieces joined together by welding, adhesive, fasteners, threading, or any other suitable fastening means.

In an embodiment, the tolerance ring 100 can include any material commonly used in the tolerance ring 100 arts. The tolerance ring 100 can comprise any suitable material with sufficient rigidity to withstand axial and longitudinal forces. In a particular embodiment, the tolerance ring 100 can comprise an injection molded polymer. In another embodiment, the tolerance ring 100 can comprise a metal or alloy (such as, but not limited to, aluminum, zinc, copper, magnesium, tin, platinum, titanium, tungsten, lead, iron, bronze, steel, spring steel, stainless steel) formed through a machining process. In yet another embodiment, the tolerance ring 100 can comprise a ceramic or any other suitable material. The tolerance ring 100 can be formed from a single piece, two pieces, or several pieces joined together by welding, adhesive, fasteners, threading, or any other suitable fastening means.

In an embodiment, as shown in FIG. 2, the tolerance ring 100 can include a composite material. For example, the tolerance ring 100 can include a substrate 119 and a low friction material 104. The low friction material 104 can be coupled to at least a portion of the substrate 119, most notably the portion of the substrate along a projection 120. In a further embodiment, the low friction material 104 can be coupled to an entire major surface of the sidewall 103 e.g., the radially inner 103a or radially outer surface 103b of the sidewall 103. In a particular embodiment, the low friction material 104 can be coupled to the radially inner surface of the substrate 119 so as to form a low friction interface with at least one of the inner component 306 or outer component 302.

In an embodiment, the substrate 119 can at least partially include a metal. The metal may include aluminum, zinc, copper, magnesium, tin, platinum, titanium, tungsten, lead, iron, bronze, alloys thereof, or may be another type. More particularly, the substrate can at least partially include a steel, such as a stainless steel. For example, the substrate can at least partially include a 301 stainless steel. The 301 stainless steel may be annealed, ¼ hard, ½ hard, ¾ hard, or full hard. The substrate 119 may include a woven mesh or an expanded metal grid. Alternatively, the woven mesh can be a woven polymer mesh. In an alternate embodiment, the substrate 119 may not include a mesh or grid. Optionally, the tolerance ring 100 may include at least one adhesive layer 121 that may include any known adhesive material common to the tolerance ring arts including, but not limited to, fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. In another alternate embodiment, the substrate 119, as a solid component, woven mesh or expanded metal grid, may be embedded between at least one adhesive layer 121 included between the friction material 104 and the substrate 119.

Optionally, the substrate 119 may be coated with temporary corrosion protection layers 704 and 705 to prevent corrosion of the load bearing substrate prior to processing. Additionally, a temporary corrosion protection layer 708 can be applied over layer 704. Each of layers 704, 705, and 708 can have a thickness of about 1 to 50 microns, such as about 7 to 15 microns. Layers 704 and 705 can include a phosphate of zinc, iron, manganese, or any combination thereof, or a nano-ceramic layer. Further, layers 704 and 705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Temporary corrosion protection layers 704, 706, and 708 can be removed or retained during processing.

Optionally, the tolerance ring 100 may further include a corrosion resistant coating 125. The corrosion resistant coating 125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 127 can include a phosphate of zinc, iron, manganese, tin, or any combination thereof, or a nano-ceramic layer. The adhesion promoter layer 127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, the low friction material 104 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction material 104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction material includes polyketone, such as polyether ether ketone (PEEK), polyether ketone, polyether ketone ketone, polyether ketone ether ketone, a derivative thereof, or a combination thereof. In an additional example, the low friction material may be an ultra high molecular weight polyethylene. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers may be used according to particular embodiments.

The low friction material 104 may further include fillers, including glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and barium sulfate, or any combination thereof. Fillers can be in the form of beads, fibers, powder, mesh, or any combination thereof.

In an embodiment, the sidewall 103 can have a thickness $T_{SW}$ in a range of 0.1 mm and 25 mm. In a more particular embodiment, the sidewall 103 can have a thickness $T_{SW}$ in a range of 0.1 mm and 1 mm, in a range of 0.2 mm and 1 mm, in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness $T_{SW}$ can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a more particular embodiment, the sidewall 103 can have a thickness $T_{SW}$ between 0.35 mm and 0.65 mm.

In an embodiment, the low friction layer can have a thickness $T_{FL}$ in a range of 0.1 mm and 0.4 mm, such as in a range of 0.15 mm and 0.35 mm, or even in a range of 0.2 mm and 0.3 mm. In this embodiment, the substrate 119 can form all, or nearly all, of the remaining thickness of the sidewall 103.

In some embodiments, the tolerance ring 100 may be formed from spring steel (e.g., cold rolled stainless steel) and may have a low friction layer 104 laminated thereto. For example, the stainless steel may be 0.1 to 0.7 mm thick, and the low friction may be in a range of about 0.05 to 0.50 mm thick (e.g., 0.25 mm) and bonded to the steel before the tolerance ring 100 may be formed into its circular shape.

In an embodiment, the thickness of the sidewall 103 may be uniform, i.e., a thickness at a first location of the sidewall 103 can be equal to a thickness at a second location therealong. In another embodiment, the thickness of the sidewall 103 may vary, i.e., a thickness at a first location of the sidewall 103 may be different than a thickness at a second location therealong.

In an embodiment, referring to FIG. 1, the tolerance ring 100 may have a radius $R_T$ of at least 2.5 mm, at least 5 mm, at least 10 mm, at least 15 mm, at least 20 mm, at least 30 mm, at least 40 mm. The radius $R_T$ may be no greater than 5 mm, no greater than 10 mm, no greater than 15 mm, no greater than 20 mm, no greater than 30 mm, no greater than 40 mm, or no greater than 50 mm. In an embodiment, the tolerance ring 100 can have an axial length, $L_T$, as measured between axial ends 115, 117, of no greater than 5 mm, no greater than 10 mm, no greater than 15 mm, no greater than 20 mm, no greater than 30 mm, no greater than 40 mm, or no greater than 50 mm. The tolerance ring 100 can have an axial length, $L_T$, as measured between axial ends 115, 117, of at least 5 mm, at least 10 mm, at least 15 mm, at least 20 mm, at least 30 mm, at least 40 mm, or at least 50 mm. The radius $R_T$ may vary along the axial length $L_T$.

In an embodiment, referring to FIGS. 4A-4D, the shaft 306 or inner component may have an inner radius $R_{S1}$ of at least 2.5 mm, at least 5 mm, at least 10 mm, at least 15 mm, at least 20 mm, at least 30 mm, at least 40 mm. The inner radius $R_{S1}$ may be no greater than 5 mm, no greater than 10 mm, no greater than 15 mm, no greater than 20 mm, no greater than 30 mm, no greater than 40 mm. The shaft 306 or inner component may have an outer radius $R_{S2}$ of at least 5 mm, at least 10 mm, at least 15 mm, at least 20 mm, at least 30 mm, at least 40 mm. The outer radius $R_{S2}$ may be no greater than 5 mm, no greater than 10 mm, no greater than 15 mm, no greater than 20 mm, no greater than 30 mm, no greater than 40 mm, or no greater than 50 mm. In an embodiment, the shaft 306 or inner component can have an axial length, $L_S$, as measured between axial ends 315, 317, of no greater than 5 mm, no greater than 10 mm, no greater than 15 mm, no greater than 20 mm, no greater than 30 mm, no greater than 40 mm. The shaft 306 or inner component can have an axial length, $L_S$, as measured between axial ends 315, 317, of at least 5 mm, at least 10 mm, at least 15 mm, at least 20 mm, at least 30 mm, at least 40 mm, or at least 50 mm. The inner radius $R_{S1}$ may vary along the axial length $L_S$. The outer radius $R_{S2}$ may vary along the axial length $L_S$.

In an embodiment, referring to FIGS. 4A-4D, the housing 302 or outer component may have an inner radius $R_{H1}$ of at least 2.5 mm, at least 5 mm, at least 10 mm, at least 15 mm, at least 20 mm, at least 30 mm, at least 40 mm. The inner radius $R_{H1}$ may be no greater than 5 mm, no greater than 10 mm, no greater than 15 mm, no greater than 20 mm, no greater than 30 mm, no greater than 40 mm. In an embodiment, the housing 302 or outer component may have an outer radius $R_{H2}$ of at least 5 mm, at least 10 mm, at least 15 mm, at least 20 mm, at least 30 mm, at least 40 mm, or no greater than 50 mm. The outer radius $R_{H2}$ may be no greater than 5 mm, no greater than 10 mm, no greater than 15 mm, no greater than 20 mm, no greater than 30 mm, no greater than 40 mm. In an embodiment, the housing 302 or outer component can have an axial length, $L_H$, as measured between axial ends 305, 307, of no greater than 5 mm, no greater than 10 mm, no greater than 15 mm, no greater than 20 mm, no greater than 30 mm, no greater than 40 mm. The housing 302 or outer component can have an axial length, $L_H$, as measured between axial ends 305, 307, of at least 5 mm, at least 10 mm, at least 15 mm, at least 20 mm, at least 30 mm, at least 40 mm, or at least 50 mm. The inner radius $R_{H1}$ may vary along the axial length $L_H$. The outer radius $R_{H2}$ may vary along the axial length $L_H$.

Referring back to FIG. 1, in a number of embodiments, at least one projection 120 may be at least partially coupled to the tolerance ring 100. In an embodiment, the projection 120 may be formed in the tolerance ring 100. The projection 120 can be monolithic with the sidewall 103, i.e., the projection 120 may have a unitary construction with the sidewall 103. In another particular embodiment, at least one of the projections 120 may comprise a separate component attached to the sidewall 103. For example, the separate component may be attached to the sidewall 103 by an adhesive, welding, crimping, or any other suitable process recognizable in the art. In an embodiment, the projection 120 may be located axially inward of an axial edge 115, 117 of the sidewall 103 of the tolerance ring 103. In an embodiment, at least one projection 120 can extend radially outward from the sidewall 103. In an embodiment, at least one projection 120 can extend radially inward from the sidewall 103.

Each projection 120 can define an aspect ratio as measured by a length thereof in the axial direction as compared to a width thereof, as measured in the circumferential direction. In an embodiment, at least one of the projection 120 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

Referring FIG. 1, in an embodiment, at least one of the projection 120 can be coupled to the sidewall 103 along a first side 701 thereof (indicated at dashed line 707). In an embodiment, the at least one projections 120 can be continuously disconnected from the sidewall 103 along the remaining sides. For example, the at least one projection 120 can be continuously disconnected from an entire third side (opposite the first side 707) and at least a portion of opposite second and fourth sides (each extending between the first and third sides). This may form a bore 750 in the sidewall 103. As used herein, "continuously disconnected" refers to a single disconnection or gap between the projection 120 and the sidewall 103. In such a manner, the projection 120 can be attached to the sidewall 103 along only one side.

The projection 120 may be formed by a process, such as, for example, stamping, pressing, or cutting. In an embodiment, at least one of the projections 120 may be formed prior to formation of the sidewall 103, e.g., prior to rolling a flat sheet to form the sidewall 103. In an embodiment, at least one of the projections 120 may be formed after formation of the sidewall 103, e.g., after rolling a flat sheet to form the sidewall 103.

Figure 5:
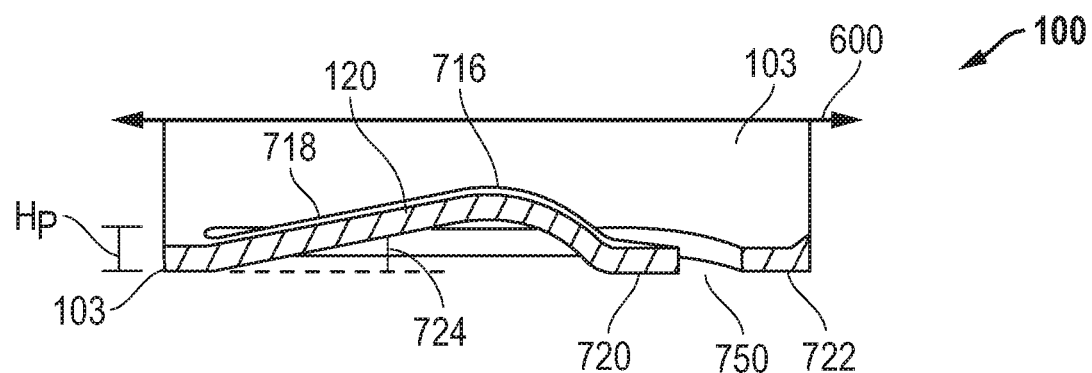
FIG. 5 is a close-up cross-sectional view of one embodiment of a tolerance ring constructed in accordance with the invention.

In an embodiment, as shown in FIG. 5, at least one of the projections 120 may have an arcuate profile. The projections 120 may include at least one generally arcuate edge. In another embodiment, at least one of the projections 120 may have a polygonal profile. The projections 120 may include at least one polygonal angle. For example, the projections 120 may include a triangle or a quadrilateral shape extending from the sidewall 103. In yet another embodiment, at least one of the projections 120 may have an arcuate portion and a polygonal portion.

In an embodiment, at least two of the projections 120 have the same geometric shape or size as compared to each other. In a further embodiment, all of the projections 120 may have the same geometric shape or size as compared to each other. In another embodiment, at least two of the projections 120 may have different geometric shapes or sizes as compared to each other. In a further embodiment, all of the projections 120 may have different geometric shapes or sizes as compared to each other.

Referring again to FIG. 1, in a more particular embodiment, the tolerance ring 100 can include a plurality of projections 120 at least partially coupled to the sidewall 103. The plurality of projections 120 can include an (first) projection 120a and an (second) projection 120b.

In an embodiment, the plurality of projections 120 can be spaced apart in a circumferential direction around the sidewall 103. In a more particular embodiment, each of the plurality of projections 120 may be spaced apart from one another an equal distance as measured around a circumference of the sidewall 103.

In an embodiment, the plurality of projections 120 can be disposed in at least two circumferentially extending rows. In a particular embodiment, the plurality of projections 120 may be disposed in at least 3 circumferentially extending rows, such as at least 4 circumferentially extending rows, at least 5 circumferentially extending rows, or even at least 6 circumferentially extending rows. In another embodiment, the plurality of projections 120 can be disposed in no greater than 25 circumferentially extending rows, such as no greater than 15 circumferentially extending rows, no greater than 10 circumferentially extending rows, or even no greater than 7 circumferentially extending rows.

In an embodiment, the projections 120a, 120b can extend from the sidewall 103 in different directions. In a more particular embodiment, the projections 120a, 120b can extend in opposite radial directions from the interior sidewall 103a and the exterior sidewall 103b. In a more particular embodiment, the projections 120a, 120b can extend in opposite directions. In an embodiment, the projections 120a, 120b may extend away from each other, i.e., the connected sides 707 of the projections 120a, 120b may be closer together than any other portion of the projections 120a, 120b.

In an embodiment, the projections 120 can each define an axial bisecting line. In an embodiment, the axial bisecting lines of at least two projections 120 can be oriented parallel, i.e., the at least two projections 120 may be oriented parallel to each other. In a more particular embodiment, all of the projections 120 can be oriented parallel with respect to each other.

The projections 120 can each define a maximum circumferential gap distance, GC, as measured with respect to the sidewall 103 in a circumferential direction (perpendicular to axis 600), and a maximum axial gap distance, GA, as measured with respect to the sidewall 103 in an axial direction (along axis 600). In an embodiment, GA can be different than GC.

In a particular embodiment, the maximum axial gap distance, GA, can be greater than the maximum circumferential gap distance, GC. For example, GA can be at least 105% GC, such as at least 110% GC, at least 120% GC, at least 120% GC, or even at least 145% GC. In another embodiment, GA can be no greater than 500% GC, such as no greater than 400% GC, no greater than 300% GC, or even no greater than 200% GC.

Referring to FIGS. 1 and 5, at least one of the projections 120 can cant relative to a central axis 600 of the tolerance ring 100. In certain embodiments, GC and GA may be equal prior to canting the projections 120 relative to the central axis 600.

In an embodiment, as shown in FIG. 5, each projection 120 can define a radially innermost surface 716 and a bridge portion 718 connecting the radially innermost surface 716 to the sidewall 103. In an embodiment, the projection 120 may fill a portion of a bore 750 on a side of the sidewall 103 of the tolerance ring 100. A best fit line of the bridge portion 718 can cant relative to the central axis 600. The bridge portion 718 can form an angle 724 with respect to the sidewall 103, as measured in the unassembled or unloaded state. By way of a non-limiting embodiment, the angle 724 between the bridge portion 718 and the sidewall 103 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, the projection 120 may have a radially innermost surface 716 which may have a diameter that is less than the diameter of the sidewall 103. In a number of embodiments, the projection radially innermost surface 716 may have a diameter D and the sidewall may have a diameter $D_S$ where $D_{IM} \leq D_S$, such as $D_{IM} \leq 0.95 D_S$, $D_{IM} \leq 0.9 D_S$, $D_{IM} \leq 0.90 D_S$, $D_{IM} \leq 0.85 D_S$, $D_{IM} \leq 0.8 D_S$, $D_{IM} \leq 0.75 D_S$, $D_{IM} \leq 0.7 D_S$, $D_{IM} \leq 0.65 D_S$, $D_{IM} \leq 0.6 D_S$, $D_{IM} \leq 0.55 D_S$, $D_{IM} \leq 0.5 D_S$, $D_{IM} \leq 0.4 D_S$, $D_{IM} \leq 0.2 D_S$, or $D_{IM} \leq 0.1 D_S$.

Figure 6:
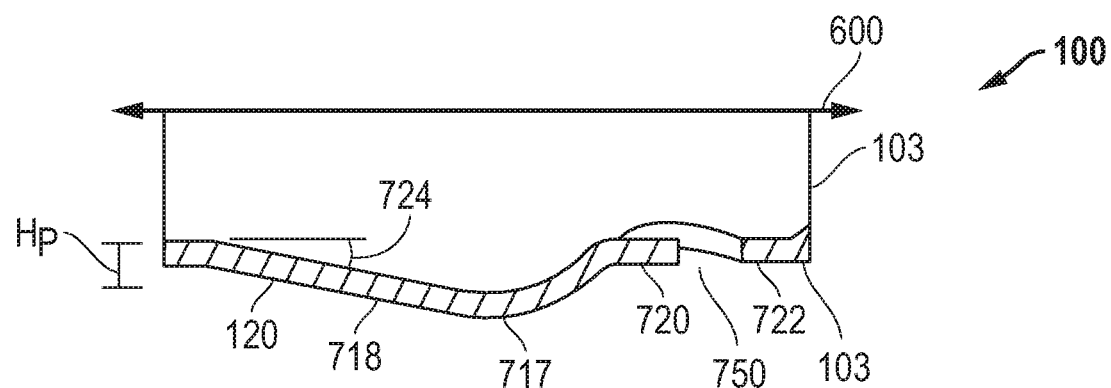
FIG. 6 is a close-up cross-sectional view of one embodiment of a tolerance ring constructed in accordance with the invention.

In another embodiment, in an opposite orientation shown in FIG. 6, each projection 120 can define a radially outermost surface 717 and a bridge portion 718 connecting the radially outermost surface 717 to the sidewall 103. A best fit line of the bridge portion 718 can cant relative to the central axis 600. The bridge portion 718 can form an angle 724 with respect to the sidewall 103, as measured in the unassembled or unloaded state. By way of a non-limiting embodiment, the angle 724 between the bridge portion 718 and the sidewall 103 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, the projection 120 may define a radially outermost surface 717 which may have a diameter that may be greater than the diameter of the sidewall 103. In a number of embodiments, the projection radially outermost surface 717 may have a diameter $D_{OM}$ and the sidewall may have a diameter $D_S$ where $D_S \leq D_{OM}$, such as $D_S \leq 0.95 D_{OM}$, $D_S \leq 0.9 D_{OM}$, $D_S \leq 0.90 D_{OM}$, $D_S \leq 0.85 D_{OM}$, $D_S \leq 0.8 D_{OM}$, $D_S \leq 0.75 D_{OM}$, $D_S \leq 0.7 D_{OM}$, $D_S \leq 0.65 D_{OM}$, $D_S \leq 0.6 D_{OM}$, $D_S \leq 0.55 D_{OM}$, $D_S \leq 0.5 D_{OM}$, $D_S \leq 0.4 D_{OM}$, $D_S \leq 0.2 D_{OM}$, or $D_S \leq 0.1 D_{OM}$.

In a number of embodiments, as shown in FIGS. 4A-4D, the projection 120 may be installed to couple to the inner component 306 or the outer component 302. In an embodiment, the projection 120 may contact or couple to at least one of the inner component 306 or the outer component 302 to prevent or restrict axial displacement of the tolerance ring 100 with resect to the inner component 306 or the outer component 302 which may be interior and exterior to the tolerance ring 100 respectively. In an embodiment, the projection 120 may contact or couple to at least one of the inner component 306 or the outer component 302 to prevent or restrict axial displacement of the inner component 306 relative to the outer component 302. In an embodiment, the projection 120 may contact or couple to at least one of the inner component 306 or the outer component 302 to prevent or restrict axial displacement of the outer component 302 relative to the inner component 306.

After installation of the inner component 306 or outer component 302 to contact the tolerance ring 100 within the assembly 2, the angle 724 of the bridge portion 718 can decrease or increase with respect to the sidewall 103. The post-installation angle 724 may be dependent on the relative diameter of the inner component 306 or outer component 302 with respect to the tolerance ring 100. Therefore, the tolerance ring 100 can couple with inner components 306 or outer components 302 having diameters that may be less than the diameter of the sidewall 103 and greater than the best fit circle formed by the innermost surfaces 716 of the projections 120. Further, the tolerance ring 100 can couple with inner components 306 or outer components 302 having diameters that may be greater than the diameter of the sidewall 103 and less than the best fit circle formed by the innermost surfaces 716 of the projections 120.

In a particular embodiment, each projection 120 can further include an end portion 720 extending radially outward from the innermost surface 716. The end portion 720 can extend from the innermost surface 716 opposite the bridge portion 718. In an embodiment, the end portion 720 may extend toward the first axial end 115 of the tolerance ring 100. In an embodiment, the end portion 720 may extend toward the second axial end 117 of the tolerance ring 100. In an embodiment, a portion of the end portion 720 of the projection 120 can extend radially outward beyond an outer surface 722 of the generally sidewall 103. In another embodiment, an outer surface of the end portion 720 can lie along the same plane as the outer surface 722 of the sidewall 103. In yet a further embodiment, the outer surface of the end portion 720 can terminate radially inside of the outer surface 722 of the sidewall 103. Termination of the end portion 720 radially inside of the outer surface 722 may be particularly suitable when the tolerance ring 100 may be encased in an outer component 302 that limits radially outward deflection of the end portion 720 beyond the outer surface 722.

As shown in FIGS. 4A-4D, the projection 120 may be a finger projection which contacts an inner surface of the inner component 306 to form an installed state within the assembly 2. In a similar way, the projection 120 may be a finger projection which contacts an outer surface of the inner component 302 to form an installed state within the assembly 2. In an alternative embodiment, the projection 120 may be a finger projection which contacts an inner surface of the outer component 302 to form an installed state within the assembly 2. In a similar way, the projection 120 may be a finger projection which contacts an outer surface of the outer component 302 to form an installed state within the assembly 2. As shown, the end portion 720 of the projection 120 may contact the surface of the inner or outer component 302, 306 to prevent or restrict axial displacement of the inner component 306 relative to the outer component 302, the outer component 302 relative to the inner component 306, or the tolerance ring 100 relative to either the outer component 302 or the inner component 306. In a number of embodiments, the at least one projection 120 may contact an outer surface of the outer component 302 or inner component 306 such that at least one axial end 305, 307, 315, 317 at least one of the inner component 302 or inner component 306 terminates at the at least one projection 120 so as not to extend axially beyond the projection 120 in a first axial direction.

In another embodiment, as shown in FIG. 3, the projection 120 end portion 720 may connect with the outer surface 722 of the sidewall 103 to form a bridge 729 extending from the radially innermost surface 716. The bridge 729 may form an edge 727 that faces toward the first axial end 115 or the second axial end 117 of the tolerance ring 100. In this way, the projection 120 may be a wave projection extending radially inward. In an embodiment, the projection 120 may fill a portion of a bore 750 on a side of the innermost surface 716. In an embodiment, the projection 120 may fill a portion of a bore 750 on a side of the innermost surface 716. In an embodiment, the bore 750 may extend toward the first axial end 115 of the tolerance ring 100 away from the innermost surface 716. In an embodiment, the end portion 720 may extend toward the second axial end 117 of the tolerance ring 100 away from the innermost surface 716.

In yet another embodiment, the projection 120 end portion 720 may connect with the outer surface 722 of the sidewall 103 to form a bridge 729 extending from a radially outermost surface 717. The bridge 729 may form an edge 727 that faces toward the first axial end 115 or the second axial end 117 of the tolerance ring 100. In this way, the projection 120 may be a wave projection extending radially outward. In an embodiment, the projection 120 may fill a portion of a bore 750 on a side of the outermost surface 717. In an embodiment, the projection 120 may fill a portion of a bore 750 on a side of the outermost surface 717. In an embodiment, the bore 750 may extend toward the first axial end 115 of the tolerance ring 100 away from the outermost surface 717. In an embodiment, the end portion 720 may extend toward the second axial end 117 of the tolerance ring 100 away from the outermost surface 717.

In yet another embodiment, as shown in FIGS. 10A-10D, the projection 120 may include at least one radial flap 770 extending in the radial direction. The projection 120 may include two radial flaps 770, 770' along a bore 750 formed in the tolerance ring 100. The radial flaps 770, 770' may form any two-dimensional shape when viewed in the circumferential direction including a polygonal profile, a circular profile, an oval profile, an ellipsis profile, or may form a different shaped profile. The at least one radial flap 770, 770' may have a plurality of axial sides 775, 775' that may form an apex 771, 771'. In a number of embodiments, at least one of the axial sides 775, 775' forms an arcuate or tapered surface in at least one of the radial or axial direction. The apex 771, 771' may extend radially inward or radially outward. The least one radial flap 770, 770' may extend on a side of the outermost surface 717. The least one radial flap 770, 770' may extend on a side of the innermost surface 716. The at least one radial flap 770, 770' may form an edge 772, 772' that faces toward the first axial end 115 or the second axial end 117 of the tolerance ring 100. In a number of embodiments, the at leas tone radial flap 770, 770' may form an angle 779 with respect to the sidewall 103, as measured from a tangent line about the tolerance ring 100 (i.e. in the circumferential direction). By way of a non-limiting embodiment, the angle 779 can be at least 5°, such as at least 10°, at least 15°, at least 30°, or even at least 45°. In another embodiment, the angle 779 can be no greater than 90°, such as no greater than 60°, no greater than 45°, no greater than 30°, no greater than 25°, or even no greater than 20°. The least one radial flap 770, 770' and bore 750 may be formed by a process, such as, for example, stamping, pressing, or cutting.

In a number of embodiments, similar to the configurations shown in FIGS. 4A-4D, the projection 120 may be a wave projection which contacts an inner surface of the inner component 306 to form an installed state within the assembly 2. In a similar way, the projection 120 may be a wave which contacts an outer surface of the inner component 302 to form an installed state within the assembly 2. In a number of embodiments, the projection 120 may be a wave projection which contacts a first or second axial end 315, 317 of the inner component 306 to form an installed state within the assembly 2. In an alternative embodiment, the projection 120 may be a wave projection which contacts an inner surface of the outer component 302 to form an installed state within the assembly 2. In a similar way, the projection 120 may be a wave projection which contacts an outer surface of the outer component 302 to form an installed state within the assembly 2. In a number of embodiments, the projection 120 may be a wave projection which contacts a first or second axial end 305, 307 of the outer component 302 to form an installed state within the assembly 2. As described, the projection 120 edge 727 may contact the surface of the inner or outer component 302, 306 to prevent or restrict axial displacement of the inner component 306 relative to the outer component 302, the outer component 302 relative to the inner component 306, or the tolerance ring 100 relative to either the outer component 302 or the inner component 306.

Figure 7A:
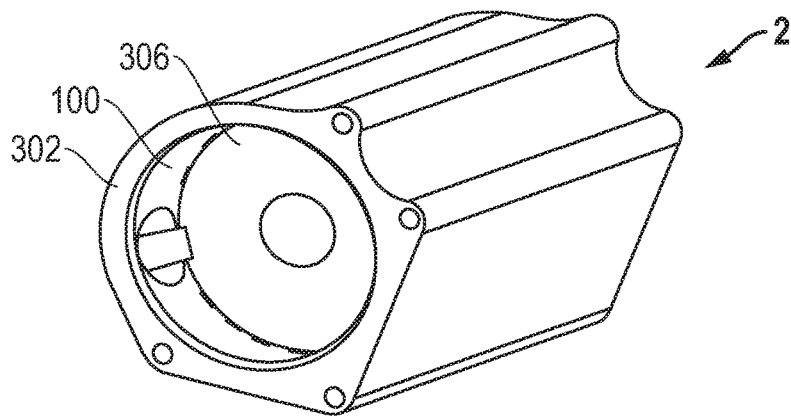
FIG. 7A is a schematic sectional side view of an assembly including a tolerance ring constructed in accordance with the invention.
Figure 7B:
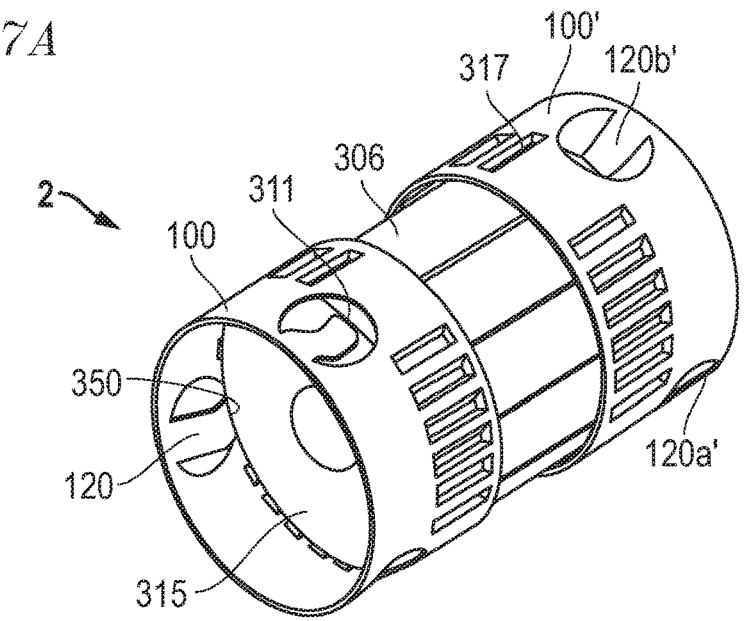
FIG. 7B is a schematic sectional side view of an assembly including a tolerance ring constructed in accordance with the invention.
Figure 7C:
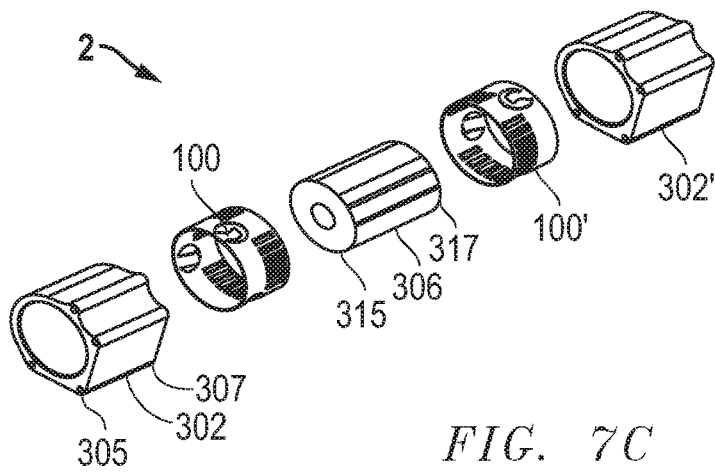
FIG. 7C is a schematic sectional side view of an assembly including a tolerance ring constructed in accordance with the invention.

In an embodiment, shown in FIGS. 7A-7B, the assembly 2 may include two tolerance rings 100, 100' within an outer component 302. The tolerance rings 100, 100' may have projections 120, 120' that couple or contact a surface of the inner component 306 to prevent or restrict axial displacement of the inner component 306 relative to the outer component 302, the outer component 302 relative to the inner component 306, or the tolerance ring 100 relative to either the outer component 302 or the inner component 306. In a number of embodiments, as shown in FIG. 8B, two tolerance rings may couple or contact two axial ends 315, 317 of the inner component 306. In a number of embodiments, two tolerance rings may couple or contact two axial ends 305, 307 of the outer component 302. In a number of embodiments, the tolerance ring 100 may include both at least one wave projection 120'b and at least one finger projection 120'a. In an embodiment, the assembly 2 may include two inner components 306, 306' coupled or contacting two tolerance rings 100, 100'. In an embodiment, shown in FIG. 7C, the assembly 2 may include two outer components 302, 302' coupled or contacting two tolerance rings 100, 100'.

In an embodiment, the projection 120 may have a radius of curvature as measured in a circumferential direction of the tolerance ring 100 that may be different than a radius of curvature of the sidewall 103. In a more particular embodiment, the projection 120 may have a larger radius of curvature as compared to the sidewall 103. In this regard, the projection 120 may appear more planar than the sidewall 103.

In an embodiment, an average thickness of at least one of the projection 120 can be approximately equal to the thickness of the sidewall 103. For example, the average thickness of the at least one projection 120 may be within 10% of the thickness of the sidewall 103. In another embodiment, the average thickness of at least one of the projection 120 may be different than the thickness of the sidewall 103, i.e., the average thickness of the projection 120 may be greater than 10% different than the thickness of the sidewall 103.

As stated above, in a number of embodiments, the projection 120 may be installed to couple to the inner component 306 or the outer component 302. In an embodiment, the projection 120 may contact at least one of the inner component 306 or the outer component 302 to prevent or restrict axial displacement of the tolerance ring 100 with resect to the inner component 306 or the outer component 302 which may be interior and exterior to the tolerance ring 100 respectively. In a particular embodiment, a radially outer surface of the end portion 720 of at least one projection 120 can contact an interior surface of at least one of the inner component 306 or the outer component 302. In another embodiment, a radially outer surface of the end portion 720 of at least one projection 120 can contact an exterior surface of at least one of the inner component 306 or the outer component 302. More particularly, at least one of the inner component 306 or the outer component 302 can support the end portion 720. Upon contacting the tolerance ring 100 to at least one of the inner component 306 or the outer component 302 within the assembly 2, the projection 120 may dynamically deflect. Moreover, the end portion 720 may slide along the interior surface or the exterior surface of the inner component 306 or the outer component 302.

In an embodiment, an average thickness of at least one of the projection 120 can be approximately equal to the thickness of the sidewall 103. For example, the average thickness of the at least one projection 120 may be within 10% of the thickness of the sidewall 103. In another embodiment, the average thickness of at least one of the projection 120 may be different than the thickness of the sidewall 103, i.e., the average thickness of the projection 120 may be greater than 10% different than the thickness of the sidewall 103. In a number of embodiments, at least one projection 120 may have a Young's modulus of about 2 to about 250 GPa. The projection 120 may include the substrate 119, low friction layer 104 or any of the layers disclosed above.

Referring again to FIGS. 1 and 3, the tolerance ring 100 may have a plurality of spaced wave structures 108 that extend radially outward from the outer surface of the tolerance ring 100. There may be a flat, circumferentially-extending rim 109 of material at each axial end of the wave structures 108. In a number of embodiments, a rim 109a, 109b of material at each axial end 105, 107 of the sidewall 103 of the tolerance ring 100. Each wave structure 108 may be separated from its neighboring wave structures by an unformed section 110 of the tolerance ring 100, which may be contiguously formed with rims 109. In a number of embodiments, the number of wave structures 108 and unformed sections 110 may be varied depending on the application of the tolerance ring. In a particular embodiment, there may be no unformed section 110 between adjacent wave structures 108.

The wave structures 108 may include axially-elongated arches or ridges 123 that may be similar in shape to waves used on conventional tolerance rings. The backside of the wave structure 108 may show an indent 145 in the sidewall 103 of the tolerance ring 100. The peak of each ridge may be rounded, and the axial ends of each ridge terminate at a tapered shoulder 111. In a number of embodiments, the wave structures 108 may be disposed axially adjacent the bore 750 and/or the projection 120. In an embodiment, the wave structures 108 may be disposed circumferentially adjacent the bore 750 and/or the projection 120. The wave structures 108 may be shoulderless.

In some embodiments, the tolerance ring 100 may be formed from a flat strip of resilient material (which forms the band 102). Before the strip is bent into its curved shape, and before the wave structures may be formed, the low friction layer 104 may be laminated onto one surface thereof. In other embodiments, the low friction layer 104 may be laminated onto both surfaces of the flat strip. After the low friction layer 104 may be attached to the flat strip, the resulting layer structure may be stamped (e.g., pressed using a suitably shaped mold, rotary wave forming, etc.) to form the wave structures 108 and projections 120. Thus, at least one of the wave structures 108 and projections 120 may be formed from both the strip of resilient material and from the low friction layer 104. The material of the low friction layer 104 may be chosen to be flexible to facilitate this stamping step. In the embodiment shown in FIG. 1, at least one wave structure 108 may project radially outward from the band 102 and the sidewall 103. In other embodiments, as shown in FIG. 3, at least one wave structure 108 may project radially inward from the band 102 and the sidewall 103. The friction layer 104 may be on the radial outside or the radial inside of the band at the interior sidewall 103a or the exterior sidewall 103b. After the wave structures 108 may be formed, the layered structure may be curved into the ring-like configuration shown in FIG. 1. In the embodiment shown, the band 102 may be the outer material. In other embodiments, the band 102 may be the inner material. In still other embodiments the wave structures 108 may extend radially inward or outward depending on the particular situation and independently of whether the band 102 provides the inner or outer material for the tolerance ring 100.

As shown in FIGS. 4A-4D, the tolerance ring 100 may be located between two components in an assembly 2. For example, it may be located in the annular space between a shaft 306 and a bore 304 in a housing 302. The wave structures 108 may be compressed between the inner and outer components 306, 302. Each wave structure may act as a spring and deforms to fit the components together with zero clearance therebetween. In other words, the inner component 306 contacts the inner surfaces of the tolerance ring 100 and the outer component 302 contacts the outer surfaces of the tolerance ring.

If forces (e.g., rotational or linear) are applied to one or both of the inner and outer components 306, 302 such that there may be a resultant force between the inner and outer components 306, 302, the inner and outer components 306, 302 can move relative to each other. Since some embodiments have zero clearance between the components 306, 302, there may be a pair of contacting surfaces that slide relative to each other. This may be the slip interface. In some embodiments, the slip interface occurs at the surfaces of contact between the low friction layer 104 and the inner component 306. The surfaces of contact may include the inner surfaces of the flat rims 109 and the "footprints" of each wave structure 108 or projection 120 (i.e., the regions around the edges of each wave structure 108 or projection 120 where they meet the band 102). The material for the low friction layer 104 and the configuration of the wave structures 108 or projections 120 provide a slip force at the slip interface that may be substantially lower than an expected value derived from the radial load force transmitted by the wave structures. This low slip force facilitates motion between the moving contact surfaces.

In contrast, at the surfaces of contact between the outer component 302 and the outer surfaces of the band 102, there may be sufficient frictional force to retain the tolerance ring 100 in place relative to the outer component 302. In other embodiments, both surfaces of the band 102 may be laminated with a low friction layer 104. Thus, there may be two slip interfaces in such embodiments.

Figure 8:
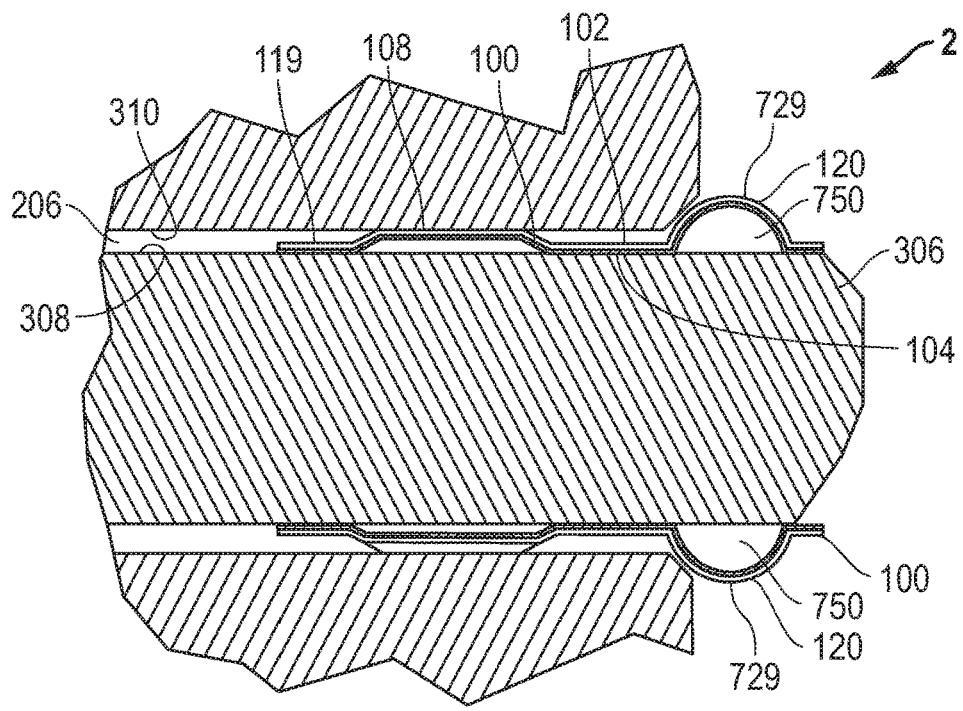
FIG. 8 is a close-up cross-sectional view of one embodiment of a assembly including a tolerance ring constructed in accordance with the invention.

FIG. 8 depicts an axial sectional view through an assembly 2 comprising another embodiment of the assembly 2, which incorporates, for example, the tolerance ring 100 shown in FIG. 3. The assembly 2 comprises a housing 302 or outer component. The housing 302 may have an axial bore 304 formed therein, which receives a shaft 306 or inner component. Tolerance rings may be used to transfer torque or as torque limiters in such applications. An annular gap 206 may exist between an outer surface 308 of shaft 306 and an inner surface 310 of bore 304. The size of this annular gap 206 may be variable because the diameter of the shaft 306 and bore 304 may vary within manufacturing tolerances. To prevent vibration of the shaft 306 within the bore 304, the annular gap 206 may be filled by tolerance ring 100 to form a zero-clearance fit between the components. FIG. 8 shows that the tolerance ring 100 comprises a band 102 which may include a substrate 119 as an outer layer and a low friction layer 104 as an inner layer that conforms to the shape of band 102. In use, the circumferential wave structures 108 of the tolerance ring 100 may be radially compressed in the annular gap between the shaft 306 and housing 302, such that the band 102 contacts the inner surface 310 of the bore 304. The slip interface may be formed where the low friction layer 104 contacts the outer surface 308 of the shaft 306. The tolerance ring 100 may reduce the gap to zero so there may be no clearance between the components in assembly 2. The projection 120 (in this embodiment a wave projection) may prevent axial displacement of the inner component 306 relative to the outer component 302, the outer component 302 relative to the inner component 306, or the tolerance ring 100 relative to either the outer component 302 or the inner component 306.

The contact area between outer surface 308 and low friction layer 104 may be a slip interface at which relative motion between the shaft 306 and the tolerance ring 100 occurs. The tolerance ring 100 may be secured relative to the housing 302 by frictional engagement at the contact area between the band 102 and the inner surface 310. If, through use, wear of the shaft 306 or low friction layer 104 occurs at the slip interface, the wave structures 208 may compensate by resiliently moving toward their rest state, thereby maintaining contact with the shaft 306 and housing 302.

Figure 9:
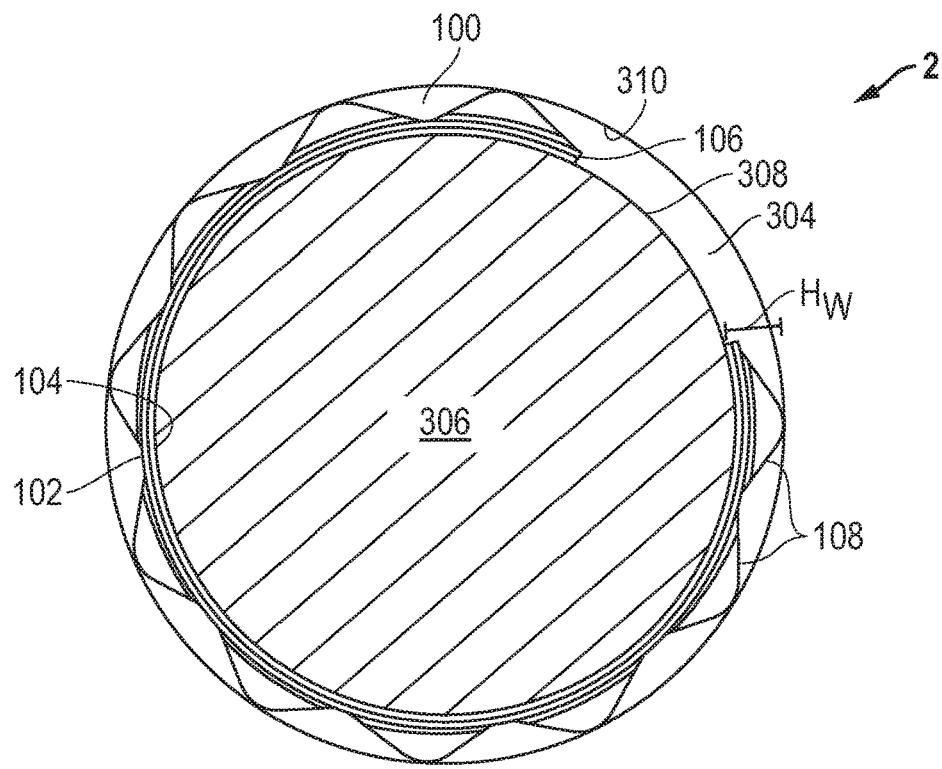
FIG. 9 is a close-up end view of one embodiment of an assembly including a tolerance ring constructed in accordance with the invention.
Figure 10A:
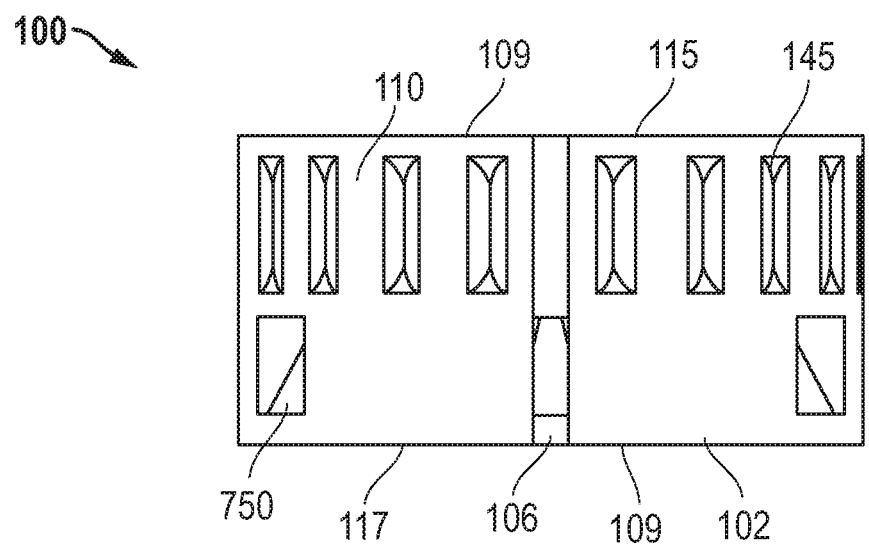
FIG. 10A is a side view of one embodiment of a tolerance ring constructed in accordance with the invention.
Figure 10B:
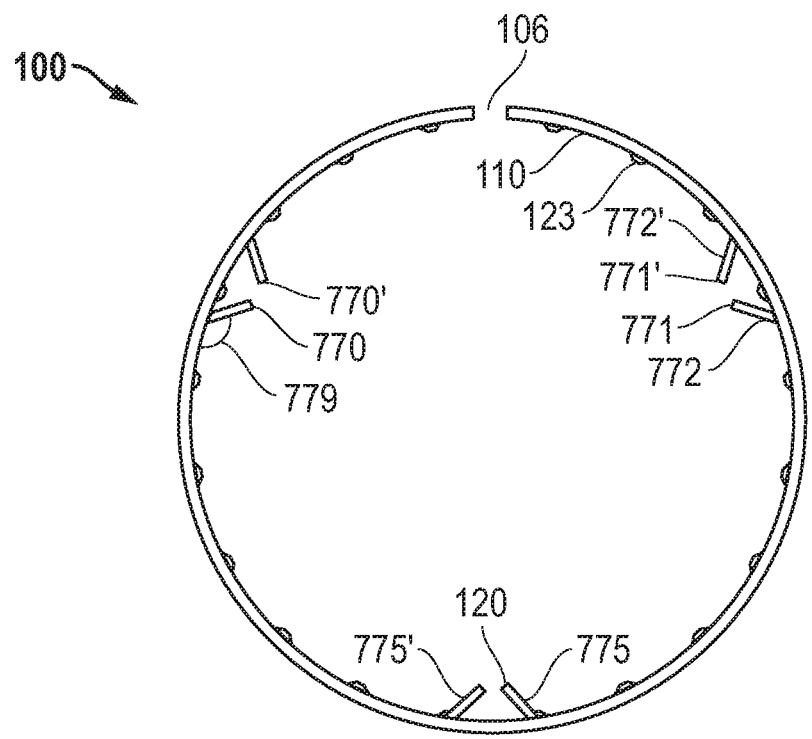
FIG. 10B is a front view of one embodiment of a tolerance ring constructed in accordance with the invention.
Figure 10C:
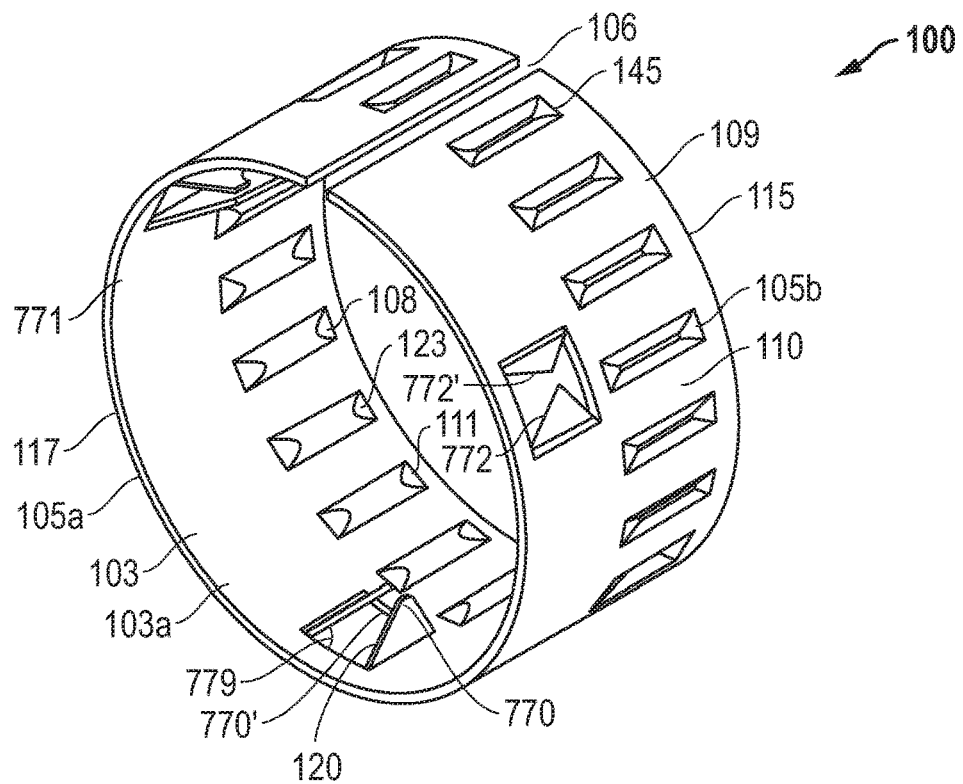
FIG. 10C is a perspective view of one embodiment of a tolerance ring constructed in accordance with the invention.
Figure 10D:
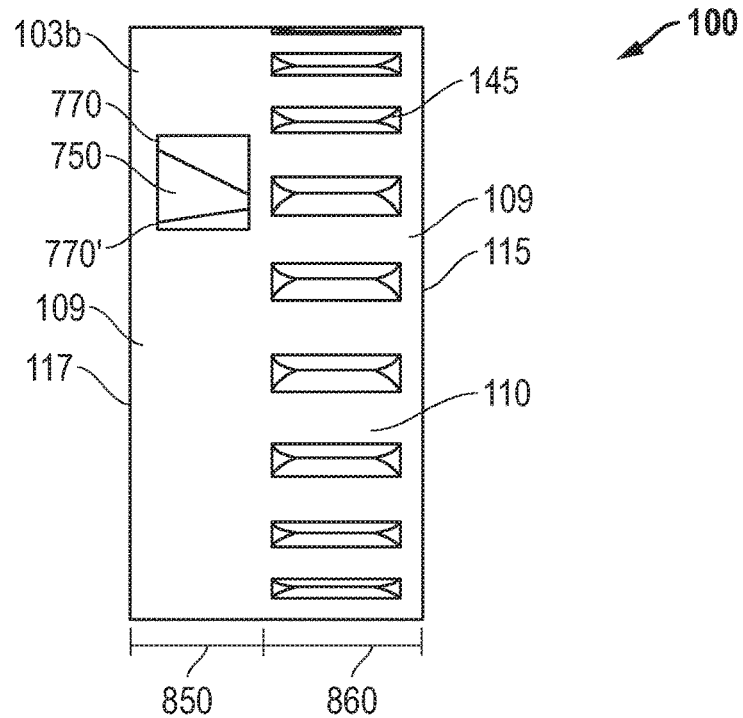
FIG. 10D is a side view of one embodiment of a tolerance ring constructed in accordance with the invention.

FIG. 9 illustrates a radial sectional view of the assembly 2 comprising housing 302 and shaft 306. In the embodiment shown, the tolerance ring 100 may be retained on the shaft 306. The outer diameter of the shaft 306 may be greater than an inner diameter of the tolerance ring 100 at rest. Thus, the tolerance ring may expand (axial gap 106 may widen) to fit the tolerance ring 100 around the surface 308 of the shaft 306. Inside the bore 304 of housing 302, the wave structures 108 may be compressed in the annular gap 206 or space between the components at inner surface 310. In this configuration, the coefficient of friction at the slip interface (between shaft 306 and low friction layer 104) may be very small compared to the coefficient of friction at the contact area between the band 102 and housing 302. Thus, slipping may be substantially limited to and occurs substantially freely at the slip interface. In other embodiments, the arrangement of the wave structures 208 and low friction layer 104 may be such that the slip interface may be between the housing 302 and the tolerance ring 200.

The tolerance ring 100 may be formed with geometrical wave structures 108 that may be designed to achieve spring characteristics as required for the particular force control application intended. The low friction layer 104 may lower the sliding forces, reduces force variation, and provides a low friction slip surface that withstands many slips without wear on the underlying materials. This allows tolerance rings 100 to be designed to fulfill force control functions not possible within the usual envelope of performance achieved by variation of tolerance ring geometry alone, such as low slip torque, low sliding force, with little force degradation over many slip cycles. For example, a tolerance ring 100 in accordance with the invention reduces sliding force or torque to approximately one-half to one-third of what would be expected for an equivalent design, metal-only tolerance ring.

In this disclosure, slip torque may be defined as the torque at which two components that may be joined by a tolerance ring 100 begin to rotate with respect to each other due to any applied torque loading to the assembly 2. The tolerance ring fixing 100 may hold the mating components together without relative rotation until this threshold value may be reached, at which point the frictional forces generated by compression of the tolerance ring waves may be overcome and respective rotation may occur, resisted by the frictional forces. Similarly, axial sliding force may be the same thing, but in an axial direction. The tolerance ring 100 may only permit axial sliding between two components if the threshold force value may be exceeded. The threshold force may be generated by the frictional forces generated by compression of the tolerance ring waves. Overload protection force, or torque, occurs where the tolerance ring 100 slip torque or sliding force may be set to be below the safe capacity of the assembly 2. The tolerance ring 100 permits slippage if the assembly 2 receives an external load, above the threshold value, that may otherwise have caused damage to the assembly 2.

Accordingly, embodiments of the tolerance ring wave structures 108 may have a greater height $H_W$ than the radial space into which they are to be assembled. Thus, as a result of assembly, the waves may be compressed and exert a force dependent on their stiffness and the amount of compression, which may be how they generate the force to hold the assembly together.

In a number of embodiments, as shown in FIG. 9, the wave structures 108 may have a radial height $H_W$ as measured from the pinnacle of the arch 123 to the sidewall 103. The wave structures 108 may have a radial height $H_W$ of at least 0.5 mm, at least 0.10 mm, at least 0.15 mm, at least 0.20 mm, at least 0.30 mm, at least 0.40 mm. The wave structures 108 may have a radial height $H_W$ that may be no greater than 0.5 mm, no greater than 0.10 mm, no greater than 0.15 mm, no greater than 0.20 mm, no greater than 0.30 mm, no greater than 0.40 mm.

In a number of embodiments, as shown in FIGS. 5-6, the projections 120 may have a radial height $H_p$ as measured from the radially innermost surface 716 or radially outermost surface 717 to the sidewall 103. The projections 120 may have a radial height $H_P$ of at least 0.5 mm, at least 0.10 mm, at least 0.15 mm, at least 0.20 mm, at least 0.30 mm, at least 0.40 mm. The projections 120 may have a radial height $H_P$ that may be no greater than 0.5 mm, no greater than 0.10 mm, no greater than 0.15 mm, no greater than 0.20 mm, no greater than 0.30 mm, no greater than 0.40 mm.

In a number of embodiments the radial height $H_P$ of the projections 120 may be greater than the radial height $H_W$ of the wave structures 108. In a number of embodiments, $H_W \leq H_p$, such as $H_W \leq 0.9\ H_p$, $H_W \leq 0.8\ H_p$, $H_W \leq 0.7\ H_p$, $H_W \leq 0.6\ H_p$, $H_W \leq 0.5\ H_p$, $H_W \leq 0.4\ H_p$, $H_W \leq 0.3\ H_p$, $H_W \leq 0.2\ H_p$, or $H_W \leq 0.1\ H_p$.

Typically, the mating components of the assembly 2 and the tolerance ring waves 108 themselves have dimensional variability within given tolerances. Thus, the actual amount of compression of the waves 108, and hence the forces generated in the assembly 2, can vary from assembly to assembly. However, if the waves 108 are compressed beyond their 'elastic zone' they behave progressively more plastically, limiting further increase in force from any further compression. This effect may be important where tolerance rings 100 provide sliding force control (either axially or rotationally) to minimize force variation due to compression variation, where the waves 108 may be designed to be compressed into their 'plastic zone.'

In some embodiments, the tolerance ring 100 provides zero clearance with low slip force for rotational or axial movement. In one aspect, the tolerance ring 100 combines a low friction layer 104 to promote slipping with a tolerance ring 100 to provide engagement across a gap between two components that move relative to each other. The low friction layer 104 may be located on an inner surface 103a or an outer surface 103b of the sidewall 103 of the tolerance ring 100. The tolerance ring 100 structure may be compressible and presents the additional advantages of being operable in a variety of gap sizes (e.g., to compensate for manufacturing embodiments in the dimensions of the components) and present a smaller contact area than conventional tolerance rings. In combination with the low friction layer 104, this design provides a significant reduction in frictional forces that oppose relative motion between the components 302, 306 even when the axial or radial load is high.

In use, each wave structure 108 may act as a spring and exerts a radial force against the components, thereby providing an interference fit between them. Rotation of the inner or outer component 302, 306 produces similar rotation in the other component as torque may be transmitted by the ring 100. Likewise, linear or axial movement of either component produces similar linear movement in the other component as linear force may be transmitted by the ring 100.

It is known to provide tolerance rings 100 that allow slipping between components 302, 306 in exceptional circumstances. For example, if relatively high forces (e.g., rotational or linear) are applied to one or both of the inner and outer components 302, 306 such that the resultant force between the components may be above a threshold value. In conventional tolerance rings that threshold value may be high and may be based on an expected value based on the radial load force experienced by the ring.

The wave structures 108 may be arranged to project away from the rim 109 to provide a plurality of discrete contact surfaces with the other of the inner and outer components 302, 306.

The wave structures may be configured to deform. This may include elastic deformation at the discrete contact surfaces to transmit the load force radially through the tolerance ring 100 between the inner and outer components 302, 306. The shape and size of each wave structure 108 may be selected based on the particular application. The slip force may depend on the shape of the wave structures 108. Typically, tolerance ring wave structures or waves 108 may be capable of transmitting relatively high radial forces (e.g., 200 N or more) to locate stably and provide radial stiffness between the inner and outer component 302, 306. Each wave structure 108 comprises a footprint region where its edges meet the band 102. The slip interface may be at the load transfer point between a footprint region and one of the inner and outer components 302, 306. For example, this may occur between the tolerance ring and the one of the inner and outer components 302, 306 that contacts the rims 109. The area of the footprint region may be relatively small, which, in combination with the low friction layer, reduces the frictional forces.

In some embodiments, the wave structures 108 may be self-contained structures. For example, each wave structure may comprise a circumferentially extending rounded ridge with tapered shoulders at its axial ends. When the tolerance ring 100 is mounted on the inner or outer component 302, 306 in an assembly 2, the tapered shoulders may act as guides to aid axial installation of the other component 302, 306.

The wave structures 108 may be carefully selected and designed for their force transfer or spring properties. The geometry of the wave structures 108 may be selected to provide desired elastic/plastic deformation characteristics. The deformation characteristics may be selected not only to take account of the manufacturing tolerances of the inner and outer components 302, 306, but also to compensate for differential thermal expansion and wear that may occur between dissimilar components in operation, thus ensuring the desired performance may be achieved throughout. These designs may be applicable to zero clearance tolerance rings 100 to ensure that the assembled components do not become loose at elevated temperatures.

In use, the band of the tolerance ring 100 may deform elastically when mounted on one of the components 302, 306 in the assembly 2. Other components 302, 306 may be mounted on the assembly 2, thereby compressing the ring in the gap 206 between the components 302, 306, preferably only the wave structures 108 deform. This deformation may be elastic or plastic, depending on the shape and/or profile of the wave structures 108 and the size of the gap 206. If only the wave structures 108 deform in this way, the force transmitting contact area at the slip interface may not be substantially altered when the ring 100 is compressed. This enables a consistent slip force to be achieved.

The low friction layer 104 comprises a series of discrete patches attached to or laminated on the band 102. For example, the low friction layer 104 may be provided at contact points at the slip interface. In one embodiment, patches of low friction material 104 may be attached to the band 102 at the footprint regions and the rims. The band 102 may be exposed where there is no contact at the slip interface.

The low friction layer 104 may be attached to a surface of the band 102 facing the inner or outer component 302, 306. The low friction layer 104 may be coated or bonded to the band 102. In one embodiment, the low friction layer 104 may be laminated on the surface of the band 102. Laminating the low friction layer 104 provides an even thickness around the band 102 to avoid thin patches that may occur if the layer is coated by immersing the band in a liquid form of the second material and spinning or otherwise shaking off the excess.

In some embodiments, the tolerance ring 100 may be secured on one of the inner or outer components 302, 306, whereby the slip interface may be between the ring and the other of the components. For example, the tolerance ring 100 may be secured or retained by resilient gripping of the band 102 on the inner component 306. In this example, the low friction layer 104 may be provided only on the inner surface of the band 102 and the wave structures may extend radially outwardly from the band 102, e.g., toward the outer component 302. With this arrangement, the slip interface may be at the contact area between the inner surface of the tolerance ring 100 and the inner component 306, where the footprints of the wave structures and the rims of the tolerance ring 100 contact the inner component 306.

The tolerance ring 100 may be secured by frictional engagement of the band on one of the components 302, 306. In split ring embodiments, the split ring 100 may be resilient so as to grip one component 306 (e.g., a shaft) that may be larger than its diameter, or expand outward against an outer component 302 (e.g., a bore in a housing) that may be smaller than its diameter. It may be desirable to permit relative movement between the inner and outer components 302, 306 in only one sense (e.g., rotational or axial). In this case, the tolerance ring 100 may be mechanically constrained with respect to one of the components to prevent relative movement at the slip interface in the undesired sense.

In a number of embodiments, the tolerance ring 100 may clip or abut into the surface of the inner component 306 through the projection 120. In a number of embodiments, the tolerance ring 100 may clip or abut into the surface of the outer component 302 through the projection 120. As shown best in FIGS. 4-4D, and FIGS. 7A-7C, the inner or outer component 302, 306 may include a groove 311 to accept the projection 120. In a number of embodiments, edges of the groove 311 prevent axial movement of the tolerance ring 100 relative to the inner or outer component 302, 306. In a number of embodiments, the groove 311 may be positioned to limit radial compression of the projections 120 of the tolerance ring 100. In a number of embodiments, the inner or outer component 302, 306 may include a projection 311 to prevent rotating movement of the inner or outer component 302, 306 relative to the other. In a number of embodiments, the inner or outer component 302, 306 may include a protrusion 350 to prevent rotating movement of the inner or outer component 302, 306 relative to the other. In a number of embodiments, the tolerance ring 100 may be positioned to limit radial compression of the projections 120 within the groove 311. If the slip interface is provided on the inner surface of the tolerance ring 100, relative axial movement of the shaft 306 and bore 304 at that interface is prevented and may instead occur at the outer surface of the tolerance ring 100. The outer surface may not have the low friction layer 104 and may therefore provide more resistance to relative motion.

The band 102 may comprise a resilient split ring, such as an open loop of material extending partly around the perimeter of the inner component 306. The configuration of wave structures may be symmetrical around the circumference of the ring with respect to the split. This arrangement may be particularly stable.

The assembly 2 also may include a drive unit (not shown) arranged to cause relative rotation between the shaft 306 and the housing 302, wherein the ring 100 may be arranged to permit circumferential slipping between the outer surface of the shaft 306 and the inner surface of the housing 302.

The low friction layer 104 may have substantially the same circumferential extent as the band 102. The low friction layer 104 may be provided at all contact points between the ring 100 and inner/outer component 302, 306 at the slip interface. The band 102 therefore does not contact the component that may be moving relative to it at the slip interface, which can reduce friction.

Each indentation 145 may be located opposite a wave structure 108. For example, the wave structures 108 may be formed by stamping, pressing or roll-forming a strip of material such that indentations 145 may be automatically formed in the backside of the strip 102 when the wave structures 108 are made.

Where the wave structures 108 are self-contained, discrete structures having walls that enclose a volume when mounted between the inner and outer components 302, 306, they may retain any grease applied before assembly and reduce or minimize subsequent leakage.

In a number of embodiments, the assembly 2 may include a motor assembly. The assembly 2 can be an e-motor assembly. The assembly 2 can include a rotor and a stator. In a number of embodiments the inner component 306 may be a rotor and the outer component 302 can be a stator. In a number of embodiments the inner component 306 may be a stator and the outer component 302 can be a rotor. The assembly 2 can also include other components commonly used in the art including, but not limited to, a frame, insulation, an end shield, a fan, a fan cover, a conduit box, a gasket cover, a draining port, a shaft slinger, a grease inlet, rotor laminations, a condenser, a brush spring, a plurality of wires, at least one field magnet, an armature, or may include another component.

In a number of embodiments, the assembly 2 may include a rolling-element bearing assembly 2. The assembly can include a first race and a second race with rolling elements located between the located between the races including, but not limited to, ball bearings, cylindrical rollers, spherical rollers, gears, tapered rollers, or needle rollers, or may be another type. In a number of embodiments the inner component 306 may be a first race and the outer component 302 can be a second race. In a number of embodiments the inner component 306 may be first race and the outer component 302 can be second race. In a number of embodiments, the inner component 306 may include a rolling-element bearing assembly 2.

According to another aspect, there may be provided a tolerance ring 100 having a generally cylindrical body 102 having a sidewall 103 that may have a top 115 and a bottom 117. The sidewall 103 may include an upper unformed band 109a and a lower unformed band 109b. The sidewall 103 may further include a plurality of wave structures 108 protruding radially from the sidewall 103 between upper unformed band 109a and a lower unformed band 109b. The sidewall 103 may further include a plurality of unformed sections 110, where each unformed section 110 may be located between a pair of adjacent shoulderless wave structures 108. The sidewall 103 may further include at least one projection 120 from the sidewall 103 that projects radially and axially to prevent axial displacement of the tolerance ring 100 with respect to a component 302, 306 interior or exterior to the tolerance ring 100.

In a number of embodiments, as shown in FIGS. 1 and 3, the tolerance ring 100 may include a first portion 850 and a second portion 860. In a number of embodiments, the first portion 850 and second portion 860 may be segmented or positioned in or along the axial direction. In a number of embodiments, the first portion 850 may contain the at least one projection 120. In a number of embodiments, the second portion 860 may contain the plurality of wave structures 108. In a number of embodiments, the first portion 850 may contain the at least one projection 120 and be free of wave structures 108. In a number of embodiments, the second portion 860 may contain the plurality of wave structures 108 and be free of the at least one projection 120.

According to still another aspect, there may be provided a method including providing an inner component 306 and an outer component 302. The method may further include providing a tolerance ring 100 between the inner component 306 and the outer component 302. The tolerance ring 100 may include a sidewall 103, and at least one projection 120 from the sidewall 103 that projects radially and axially to prevent axial displacement of the tolerance ring 100 with respect to the inner component 306. The method may further include contacting the projection to at least one of the inner component 306 or the outer component 302 to retain the tolerance ring 100 to at least one of the inner component 306 or the outer component 302. The method may further include providing a second tolerance ring 100' and positioning the second tolerance ring 100' between the inner component 306 and the outer component 302 where the first tolerance ring 100 projection 120 retains the first tolerance ring 100 to the inner component 306 and the second tolerance ring 100' comprising a projection 120' that retains the second tolerance ring 100' to the outer component 302.

In an embodiment, the assembly 2 can be installed or assembled by an assembly force of at least 10 N in a longitudinal direction relative to the shaft 4 or housing 8, such as at least 25 N, at least 50 N, at least 100 N, at least 250 N, or at least 500 N. In a further embodiment, the torque assembly 2 can be installed or assembled by an assembly force of no greater than 10000 N in a longitudinal direction relative to the shaft 4 or housing 8, such as no greater than 5000 N, no greater than 2500 N, no greater than 1000 N, no greater than 500 N, or no greater than 250 N.

In a number of embodiments, the projection 120 of the tolerance ring 100 may have a snap-in function that can reduce assembly force by a factor of 5 to 10. In a number of embodiments, the tolerance ring 100 may allow for higher disassembly forces than assembly forces.

This reduction in assembly force may prevent brinelling of a component of the assembly 2 including, but not limited to, rolling elements such as ball bearings. This reduction in assembly force may further prevent component failure of any component within the assembly 2 including the inner component 306 or the outer component 302. Further, the tolerance ring 100 may eliminate the need for additional vents in rolling element mounts and increase the tolerance range of the stator in the assembly 2. The fit of the tolerance ring 100 relative to at least one of the inner component 306 or outer component 302 may reduce assembly time by eliminating the heat needed during installation when heat shrink press fitting. The assembly 2 may be noise free or substantially free of rattling as a result of the projections 120 may act to prevent axial displacement of the tolerance ring 100 relative to the inner component 306 or the outer component 302, or the inner component 302 and the outer component 306 relative to each other. Additional machining or additional component parts within the assembly 2 may also be eliminated through use of the tolerance ring 100. This may increase the lifetime of the assembly 2 and its components. Further, thinner walls of at least one of the tolerance ring 100, inner component 306 or outer component 302 in the assembly 2 may allow for lighter assembly forces and easier installation.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A tolerance ring, comprising: a sidewall; and at least one projection from the sidewall that projects radially and axially to prevent axial displacement of the tolerance ring with respect to a component interior or exterior to the tolerance ring.

Embodiment 2

A assembly, comprising: an outer component including a bore within the outer component; an inner component disposed within the bore; and a tolerance ring mounted between the inner component and the outer component, the tolerance ring comprising: a sidewall; and at least one projection from the sidewall that projects radially and axially to prevent axial displacement of the tolerance ring with respect to the inner component or the outer component.

Embodiment 3

A method, comprising: providing an inner component and an outer component; positioning a tolerance ring between the inner component and the outer component, the tolerance ring comprising: a sidewall, and at least one projection from the sidewall that projects radially and axially to prevent axial displacement of the tolerance ring with respect to the inner component; and contacting the projection to at least one of the inner component or the outer component to retain the tolerance ring to at least one of the inner component or the outer component.

Embodiment 4

The tolerance ring, assembly, or method of any of embodiments 1, 2, or 3, wherein the projection comprises a finger projection.

Embodiment 5

The tolerance ring, assembly, or method of any of the preceding embodiments, wherein the projection comprises a wave projection.

Embodiment 6

The tolerance ring, assembly, or method of any of embodiments 1, 2, or 3, wherein the projection is located axially inward of an axial edge of the sidewall.

Embodiment 7

The tolerance ring, assembly, or method of any of embodiments 1, 2, or 3, wherein the sidewall further includes a plurality of wave structures protruding radially from the sidewall, and a plurality of unformed sections, wherein each unformed section is located between a pair of adjacent wave structures.

Embodiment 8

The tolerance ring, assembly, or method of embodiment 7, wherein each wave structure extends radially outward from the sidewall.

Embodiment 9

The tolerance ring, assembly, or method of embodiment 7, wherein each wave structure extends radially inward from the sidewall.

Embodiment 10

The tolerance ring, assembly, or method of any of embodiments 7-9, wherein the projection is a radial height $H_P$ that is greater than a radial height $H_W$ of at least one of the wave structures.

Embodiment 11

The method of embodiment 3, further comprising, positioning a second tolerance ring between the inner component and the outer component wherein the first tolerance ring projection retains the first tolerance ring to the inner component and the second tolerance ring comprises a projection that retains the second tolerance ring to the outer component.

Embodiment 12

The tolerance ring, assembly, or method of any of embodiments 1, 2, or 3, wherein the tolerance ring further comprises an axial gap in the sidewall.

Embodiment 13

The tolerance ring, assembly, or method any of embodiments 1, 2, or 3, wherein each projection extends radially outward from the sidewall.

Embodiment 14

The tolerance ring, assembly, or method of any of embodiments 1, 2, or 3, wherein each projection extends radially inward from the sidewall.

Embodiment 15

The tolerance ring, assembly, or method of embodiment 4 wherein the tolerance ring further comprises a bore and the finger projection fills a portion of the bore.

Embodiment 16

The tolerance ring, assembly, or method of embodiment 4 wherein the finger projection includes an arcuate portion.

Embodiment 17

The tolerance ring, assembly, or method of embodiment 5, wherein the wave projection comprises an arch extending from the tolerance ring.

Embodiment 18

The tolerance ring, assembly, or method of embodiment 5, wherein the tolerance ring further comprises a bore and the wave projection sits axially adjacent the bore.

Embodiment 19

The assembly of embodiment 2 wherein the inner component is a stator for a motor assembly and the outer component is a housing.

Embodiment 20

The tolerance ring, assembly, or method any of embodiments 1, 2, or 3, wherein the inner component comprises a rolling-element bearing assembly.

Embodiment 21

The tolerance ring, assembly, or method any of embodiments 1, 2, or 3, wherein the at least one projection has a Young's modulus of about 2 to about 250 GPa.

Embodiment 22

The tolerance ring, comprising: a generally cylindrical body having a sidewall that defines a top, and a bottom, wherein the sidewall includes: an upper unformed band; a lower unformed band opposite the upper unformed band; a plurality of wave structures protruding radially from the sidewall between the upper unformed band and the lower unformed band; a plurality of unformed sections, wherein each unformed section is located between a pair of adjacent shoulderless wave structures and; at least one projection from the sidewall that projects radially and axially to prevent axial displacement of the tolerance ring with respect to a component interior or exterior to the tolerance ring.

Embodiment 23

The tolerance ring, assembly, or method of any of embodiments 1, 2, or 3, wherein the tolerance ring is fixed to the outer or inner component by any of the following processes: form fit, force fit, bonding.

Embodiment 24

The tolerance ring, assembly, or method of any of embodiments 1, 2, or 3, wherein the outer or inner component includes a groove, wherein the tolerance ring is positioned to limit the radial compression of the tolerance ring projections.

Embodiment 25

The tolerance ring, assembly, or method of any of embodiments 1, 2, or 3, wherein the outer or inner component contains at least one projection or depression to prevent a rotating movement of the component.

Embodiment 26

The tolerance ring, assembly, or method of embodiment 7, wherein the tolerance ring sidewall is divided into a first portion containing the at least one projection, and a second portion containing the plurality of wave structures.

Embodiment 27

The tolerance ring, assembly, or method of embodiment 26, wherein the first portion is free of wave structures.

Embodiment 28

The tolerance ring, assembly, or method of any of embodiments 1, 2, or 3, wherein at least one of the inner component or outer component terminates at the at least one projection so as not to extend axially beyond the projection in a first direction.

This written description uses examples, including the best mode, and also to enable those of ordinary skill in the art to make and use the invention. The patentable scope of the invention is defined by the embodiments, and may include other examples that occur to those skilled in the art. Such other examples are intended to be within the scope of the embodiments if they have structural elements that do not differ from the literal language of the embodiments, or if they include equivalent structural elements with insubstantial differences from the literal languages of the embodiments. For example, embodiments may relate to rotational devices such as an electric motor, such as a windshield wiper motor), or axial sliding applications, such as a steering column adjustment mechanism.

While embodiments have been shown or described in only some of forms, it should be apparent to those skilled in the art that they are not so limited, but are susceptible to various changes without departing from the scope of the invention.

The invention claimed is:

1. A tolerance ring configured to be mounted between an inner shaft component and an outer housing component, comprising:
   an annular sidewall comprising at least one bore extending therethrough, wherein each bore is disposed axially inward from a first axial edge of the sidewall; and
   at least one projection extending radially and axially from the sidewall configured to abut an axial end surface of the inner shaft component or the outer housing component to prevent axial displacement of the tolerance ring, with respect to the inner component or the outer component, each projection comprising a pair of circumferentially-spaced radial flaps located on opposing axially-extending edges of a respective one of the bores, wherein both radial flaps are bent inwardly and outwardly in the same radial direction from the sidewall, and wherein each flap extends radially inward from perspective edge of he bore along a first side of the flap and is continuously disconnected from the bore along the remaining sides of the flap such that an end portion of each flap axially fills a portion of the bore; and
   a plurality of circumferentially-spaced axially-extending wave structures protruding radially from the sidewall adjacent a second axial edge thereof configured to engage an outer surface of the inner shfat component or an inner surface of the outer housing component, wherein an unformed section of the sidewall is located between each pair of adjacent wave structures, and wherein the radial flaps and the wave structures extend in the same radial direction from the sidewall.

2. The tolerance ring of claim 1, wherein each wave structure extends radially outward from the sidewall.

3. The tolerance ring of claim 1, wherein each wave structure extends radially inward from the sidewall.

4. The tolerance ring of claim 1, wherein the flaps have a radial height $H_P$ that is greater than a radial height $H_W$ of at least one of the wave structures. Add Go for FIG. 10 embodiment.

5. The tolerance ring of claim 1, wherein the tolerance ring further comprises an axial gap in the sidewall.

6. The tolerance ring of claim 1, wherein each projection extends radially outward from the sidewall.

7. The tolerance ring of claim 1, wherein each projection extends radially inward from the sidewall.

8. The tolerance ring of claim 1, wherein the tolerance ring comprises a substrate and a low friction material overlying the substrate.

9. The tolerance ring of claim 8, wherein the low friction material comprises a polymer.

10. An assembly, comprising:
    an outer housing component;
    an inner shaft component; and
    a tolerance ring mounted between the inner shaft component and the outer housing component, the tolerance ring comprising:
    an annular sidewall comprising at least one bore extending therethrough, wherein each bore is disposed axially inward from a first axial edge of the sidewall; and
    at least one projection extending radially and axially from the sidewall configured to abut an axial end surface of the inner shaft component or the outer housing component to prevent axial displacement of the tolerance ring, with respect to the inner component or the outer component, each projection comprising a pair of circumferentially-spaced radial flaps located on opposing axially-extending edges of a respective one of the bores, wherein both radial flaps are bent inwardly and outwardly in the same radial direction from the sidewall, and wherein each flap extends radially inward from perspective edge of he bore along a first side of the flap and is continuously disconnected from the bore along the remaining sides of the flap such that an end portion of each flap axially fills a portion of the bore; and
    a plurality of circumferentially-spaced axially-extending wave structures protruding radially from the sidewall adjacent a second axial edge thereof configured to engage an outer surface of the inner shfat component or an inner surface of the outer housing component, wherein an unformed section of the sidewall is located between each pair of adjacent wave structures, and wherein the radial flaps and the wave structures extend in the same radial direction from the sidewall.

11. The assembly of claim 10, wherein the inner component comprises a rolling-element bearing assembly.

12. The assembly of claim 10, wherein the tolerance ring is fixed to the outer or inner component by any of the following processes: form fit, force fit, bonding.

13. The assembly of claim 10, wherein the outer or inner component includes a groove.

14. The assembly of claim 10, wherein the outer or inner component contains at least one projection or depression.

15. A method, comprising:
    providing an inner shaft component and an outer housing component;
    positioning a tolerance ring between the inner shaft component and the outer housing component, the tolerance ring comprising:
    an annular sidewall comprising at least one bore extending therethrough, wherein each bore is disposed axially inward from a first axial edge of the sidewall; and
    at least one projection extending radially and axially from the sidewall configured to abut an axial end surface of the inner shaft component or the outer housing component to prevent axial displacement of the tolerance ring, with respect to the inner component or the outer component, each projection comprising a pair of circumferentially-spaced radial flaps located on opposing axially-extending edges of a respective one of the bores, wherein both radial flaps are bent inwardly and outwardly in the same radial direction from the sidewall, and wherein each flap extends radially inward from perspective edge of he bore along a first side of the flap and is continuously disconnected from the bore along the remaining sides of the flap such that an end portion of each flap axially fills a portion of the bore; and
    a plurality of circumferentially-spaced axially-extending wave structures protruding radially from the sidewall adjacent a second axial edge thereof configured to engage an outer surface of the inner shfat component or an inner surface of the outer housing component, wherein an unformed section of the sidewall is located between each pair of adjacent wave structures, and wherein the radial flaps and the wave structures extend in the same radial direction from the sidewall; and
    contacting the projection to one of the inner shaft component or the outer housing component to retain the tolerance ring to the inner component or the outer component.

* * * * *